US007803048B2

(12) United States Patent
Tilston et al.

(10) Patent No.: US 7,803,048 B2
(45) Date of Patent: Sep. 28, 2010

(54) RADAR MANIPULATION IN A VIDEO GAME

(75) Inventors: Christopher Ian Tilston, Nuneaton (GB); Laurence Richard Cheers, Tamworth (GB)

(73) Assignee: Microsoft Corporation, Redmond, WA (US)

( * ) Notice: Subject to any disclaimer, the term of this patent is extended or adjusted under 35 U.S.C. 154(b) by 1232 days.

(21) Appl. No.: 11/276,807

(22) Filed: Mar. 15, 2006

(65) Prior Publication Data

US 2007/0218966 A1    Sep. 20, 2007

(51) Int. Cl.
*A63F 9/24* (2006.01)
(52) U.S. Cl. ............................................ 463/31; 463/2
(58) Field of Classification Search .................... 463/31; 434/2–5; 342/176, 179, 182, 183
See application file for complete search history.

(56) References Cited

U.S. PATENT DOCUMENTS

| 5,887,125 | A | 3/1999 | Takano et al. |
| 6,041,335 | A | 3/2000 | Merritt et al. |
| 6,329,990 | B1 | 12/2001 | Silverbrook et al. |
| 6,373,490 | B1 | 4/2002 | Bendiksen et al. |
| 7,102,651 | B1 | 9/2006 | Louveaux et al. |
| 7,164,499 | B1 | 1/2007 | Gupta |
| 2002/0082080 | A1* | 6/2002 | Kojima ........................ 463/31 |
| 2004/0085358 | A1 | 5/2004 | Tolmer et al. |
| 2005/0097453 | A1 | 5/2005 | Simonyi |
| 2005/0120239 | A1 | 6/2005 | Monroe et al. |
| 2006/0109499 | A1 | 5/2006 | Klassen et al. |
| 2007/0293313 | A1* | 12/2007 | Shimizu et al. ............... 463/31 |

OTHER PUBLICATIONS

Metal Gear SOlid User Manual http://www.replacementdocs.com/download.php?view.1185 Last Accessed Feb. 21, 2010.*
Microsoft Game Studios, Video Game: Halo, Published Nov. 2001.
Microsoft Game Studios, Video Game: Halo 2, Published Nov. 2004.
Apogee Software, Ltd., Video Game: Duke Nukem 3D, Published Jan. 1996.

* cited by examiner

*Primary Examiner*—John M Hotaling
*Assistant Examiner*—Marcus D Jones
(74) *Attorney, Agent, or Firm*—Woodcock Washburn LLP

(57) ABSTRACT

Methods and systems for deceiving other characters in a video game are disclosed. A video game may include a simulated environment in which player and computer controlled characters can monitor each other's positions using radar, e.g., an acoustic radar that detects noise (such as the firing of various weapons) associated with other characters. A character may fire a decoy bullet, which creates noise at the location of impact rather than the location of firing. A character may temporarily jam another character's radar so that the other character's radar does not display character locations. A first character may mimic an enemy character so that the first character appears as a friend to enemy characters on each enemy characters' radar. A special weapon may make all visible characters visually appear as enemies to a first character, thereby confusing the first character. Another special weapon may create a duplicate image of a character, thereby confusing others.

16 Claims, 9 Drawing Sheets

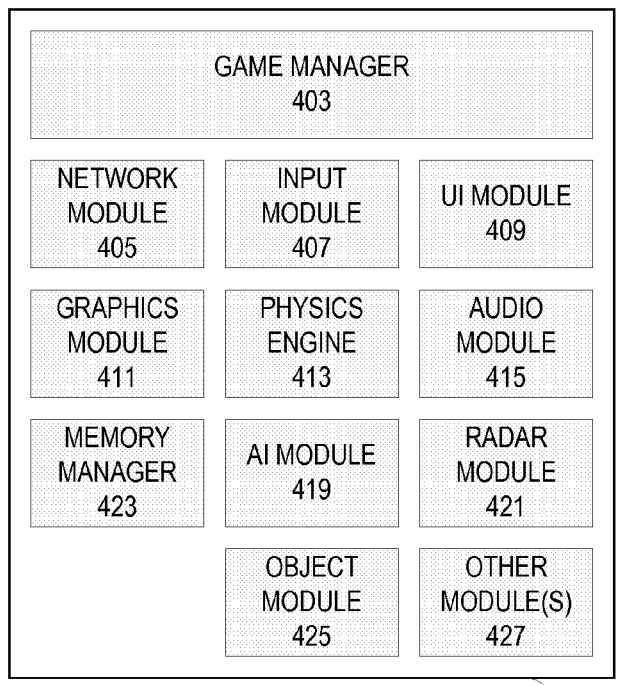
*FIG. 4*
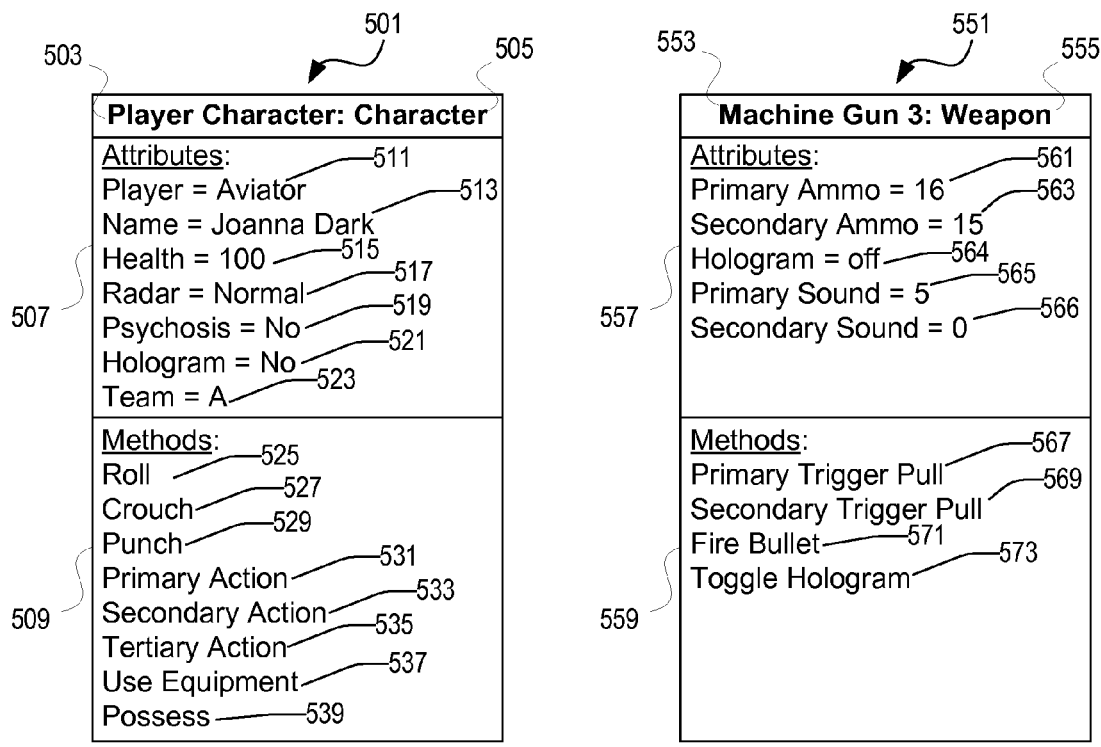
*FIG. 5A*  *FIG. 5B*

RADAR MANIPULATION IN A VIDEO GAME

BACKGROUND

As the popularity of video games grows, and more games are offered in the marketplace, video game developers continue to try to provide innovative game play to video game players, or gamers. Multiplayer video games have become increasingly popular in the video game industry over recent years, allowing players to compete against one another. The advent of online multiplayer gaming networks, such as the Xbox® LIVE gaming network provided by Microsoft Corporation of Redmond, Wash., has made it easier than ever for gamers to find one another and to play multiplayer games.

One popular genre of multiplayer games is the first-person shooter (FPS) genre. A FPS game can be characterized by the player's on-screen view of the game simulating that of the character's view, i.e., first person view. In FPS games, the player has full control over a character and can interact directly with the environment. In a multiplayer game, each player attempts to accomplish a goal within the game, either alone or in conjunction with other teammates with whom the player is playing the game. Goals include "killing" other player characters a certain number of times, capturing another team's flag, and launching an assault on another team's base, to name a few.

Many third-person shooters (e.g., where the player sees the game world from a viewpoint above and/or behind the main character) are often conceptually paired with first-person shooters, due to similarities in gameplay. In addition, some games have allowed the player to toggle the game between both viewpoints, first person view and third person view, to suit the player's preference or needs at various points during the game.

In recent years, some consider that FPS game development has stagnated, where each new FPS game provides a new storyline, while the gameplay remains the same as previous iterations of FPS games. This causes gamers to quickly get bored and lose interest in new games, and also to seek alternative forms of entertainment, e.g., a different game.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various aspects described below provide methods, systems, and computer readable media storing executable instructions for deceiving other characters in a video game. A video game may include a simulated virtual environment, or simulated environment, in which character interaction to achieve some goal takes place. According to some aspects, player controlled characters can monitor other characters' positions using a radar provided by the video game, e.g., an acoustic radar that detects noise (such as the firing of various weapons) associated with other characters.

According to an aspect described below, there is a video game method of representing characters on a radar image displayed on a video output device, by determining a first simulated noise level associated with a first character in a simulated video game environment operating under control of the video game. The first simulated noise level may result, e.g., from the first character firing various weapons, which each result in a different noise level or radar signature. The video game then displays on a second character's radar image a first radar blip identifying an approximate current location of the first character relative to the second character. The first radar blip has a first characteristic (e.g., a duration of time for display) based on the first simulated noise level associated with the first character.

According to another aspect, a character may fire a decoy bullet or other projectile, which creates noise at the location of impact rather than the location of firing. When an acoustic radar is in use, the firing character appears on radar at the location of impact of the decoy bullet rather than at the location of firing, thereby deceiving other characters as to his or her true location. In an illustrative aspect, a video game performs a method of representing characters on a radar image displayed on a video output device, by providing an acoustic radar system to a first character in a simulated environment of the video game. The acoustic radar system identifies a location of a second character in the simulated environment based on a noise level associated with the second character. The video game receives first input indicating that the second character has fired a first type of projectile in the simulated environment, and thus displays on the radar image, which corresponds to the radar system of the first character, a first radar blip corresponding to a location of impact of the projectile.

According to other aspects described below, a character may temporarily jam another character's radar so that the other character's radar does not display character locations. In an illustrative aspect, a video game performs a method of representing characters on a radar image displayed on a video output device, by providing a radar system to a first character in a simulated environment of the video game. The radar system, when in a normal operation state, identifies on the radar image a location of a second character in the simulated environment relative to a location of the first character in the simulated environment. The video game receives input indicating that the second character has performed a predetermined action directed at the first character in the simulated environment, and thus places the radar system in a jammed state for some amount of time. While in the jammed state, the radar system does not identify the location of the second character, regardless of whether the radar system would otherwise identify the location of the second character were the radar system in the normal operation state.

According to other aspects, a character may mimic an enemy character on radar so that the character appears as a friend to enemy characters on each enemy character's radar. In an illustrative aspect, a video game performs a method representing characters on a radar image displayed on a video output device, by providing a radar system to a first character in a simulated environment of the video game, where the radar system identifies on the radar image, using a first visual appearance (e.g., a first color or appearance indicating an enemy), a location of a second character in the simulated environment relative to a location of the first character in the simulated environment. The video game receives input indicating a predetermined action has occurred within the simulated environment of the video game, and then identifies the location of the second character on the radar image using a second visual appearance (e.g., a second color or appearance indicating a friend) based on the occurrence of the predetermined action.

In still other aspects, a special weapon may cause a psychosis-like effect on a player hit by the gun, making all visible characters visually appear as enemies to the character hit by the weapon, thereby confusing the player controlling the hit character. According to an illustrative aspect, a video game may perform a method of visually deceiving a video game player by visually depicting, on a video output device corresponding to the video game player, a first subset of a plurality of characters (e.g., a first team in a multi-team game) using a first visual appearance in a simulated environment under control of the video game. The first visual appearance may include a team-based common appearance, e.g., representing all team members as wearing similar uniforms. The video game visually depicts a second subset of the plurality of characters (e.g., a second team in the multi-team game) using a second visual appearance in the simulated environment. The second visual appearance is different from the first visual appearance. The second visual appearance may include another team-based common appearance, e.g., representing all team members as wearing similar uniforms. The first subset and second subset may be mutually exclusive subsets of the plurality of characters (e.g., a single player/character cannot simultaneously be on both teams). The video game detects a predetermined action within the simulated environment of the video game directed at a first character in the first subset of the plurality of players. The first character being controlled by the video game player corresponding to the video output device. The video game visually depicts on the video output device, any visible characters of the first subset of the plurality of characters using the second visual appearance (e.g., as enemies), based on the occurrence of the predetermined action. The first character thus sees all characters as enemies, and shoots at everyone because she is not able to distinguish friend from foe.

In still other aspects, a special weapon creates a hologram-like effect by creating a duplicate image of a character in the simulated environment, thereby confusing other characters. According to an illustrative aspect, a video game performs a method depicting a hologram image of a video game character, by visually depicting an actual image of a first character in the simulated environment of the video game. Upon detecting a first predetermined action corresponding to the actual image of the first character within the simulated environment, and based on the predetermined action, the video game visually depicts a hologram image of the first character in the simulated environment. The video game then moves the hologram image of the first character within the simulated environment based on movement input received from a player corresponding to the first character, e.g., in tandem with the actual image of the first character.

These and other aspects will be described in greater detail below.

BRIEF DESCRIPTION OF THE DRAWINGS

FIG. 4 illustrates a block architecture diagram of software modules that may be used to implement various features described herein.

FIG. 5A illustrates an instance of a character object according to various features described herein.

FIG. 5B illustrates an instance of a weapon object according to various features described herein.

DETAILED DESCRIPTION

In the following description of the various aspects, reference is made to the accompanying drawings, which form a part hereof, and in which is shown by way of illustration how various features described herein may be practiced. It is to be understood that other embodiments may be used and structural and functional modifications may be made.

Figure 1:
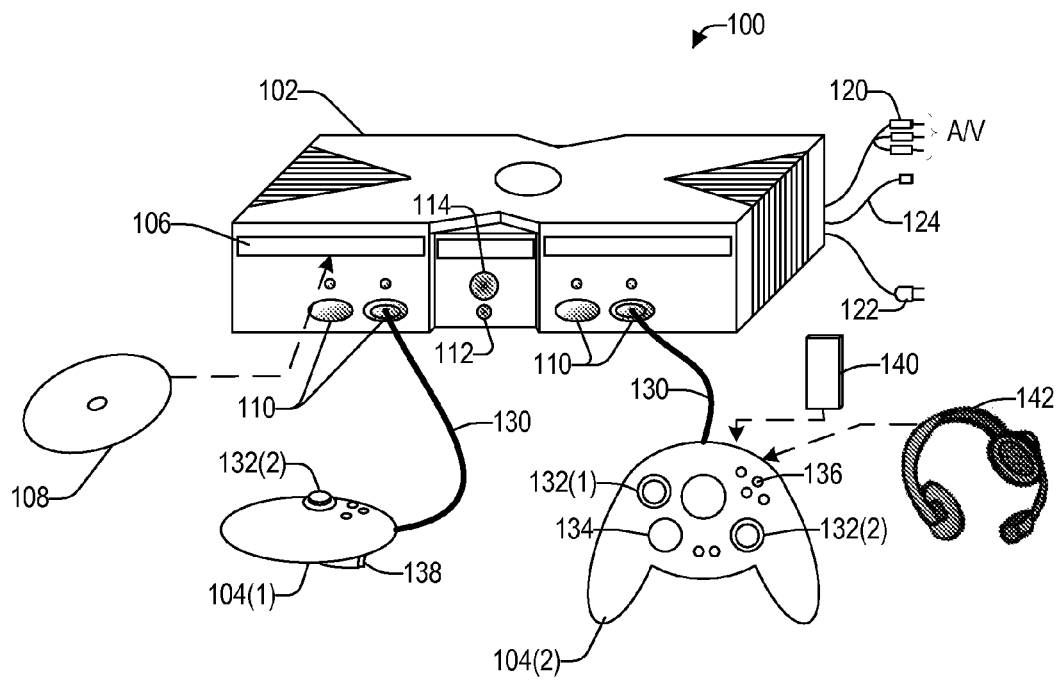
FIG. 1 illustrates a game console that may be used to implement various features described herein.

FIG. 1 illustrates an example of a suitable gaming system environment 100 on which computer games, video games, and or other electronic games (collectively referred to herein as computer games) may be played. The gaming system environment 100 is only one example of a suitable computing environment and is not intended to suggest any limitation as to the scope of use or functionality of the features described herein. Neither should the gaming system environment 100 be interpreted as having any dependency or requirement relating to any one or combination of components illustrated in the illustrative operating gaming system environment 100.

Figure 2:
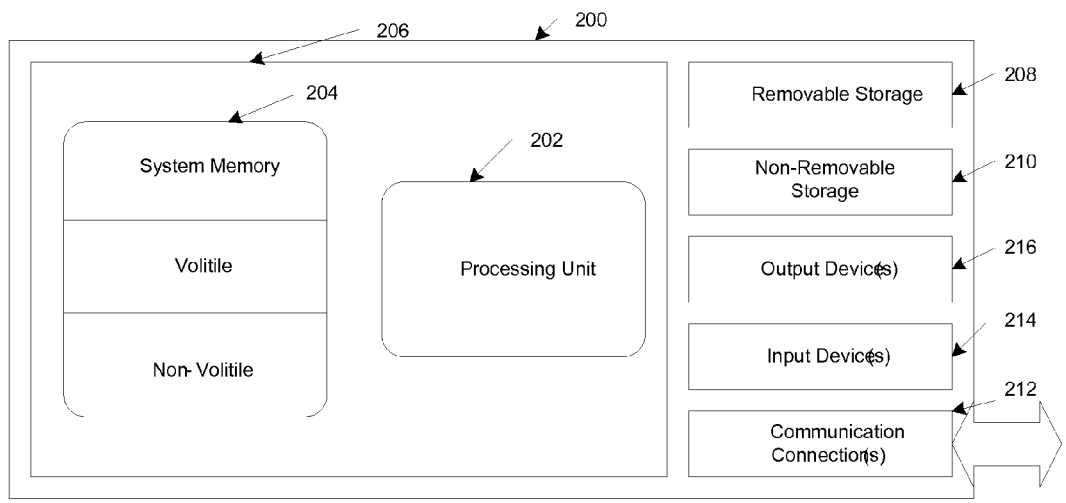
FIG. 2 illustrates a general computing environment that may be used to implement various features described herein.

Aspects described herein are operational with numerous other general purpose or special purpose computing system environments or configurations. Examples of well known computing systems, environments, and/or configurations that may be suitable for use include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; electronic game consoles, distributed computing environments that include any of the above systems or devices; and the like. Another illustrative example of a suitable operating environment is shown in FIG. 2, and further described below.

Aspects herein may be described in the general context of computer-executable instructions, such as program modules, being executed by a computer. Generally, program modules include routines, programs, objects, components, data structures, etc. that perform particular tasks or implement particular abstract data types. The features described herein may also be practiced in distributed computing environments where tasks are performed by remote processing devices that are linked through a communications network. In a distributed computing environment, program modules may be located in both local and remote computer storage media including memory storage devices.

FIG. 1 shows an exemplary gaming system 100. Gaming system 100 may include a game console 102 and one or more handheld controllers, as represented by controllers 104(1) and 104(2). The game console 102 may be equipped with an internal or external hard disk drive and a portable media drive 106 that supports various forms of portable storage media as represented by optical storage disc 108. Examples of suitable portable storage media include DVD, CD-ROM, game discs, and so forth.

Game console 102 may have a number of slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108. In some aspects, game console 102 may be a dedicated computing device for home entertainment, and may be a closed, secure system that only executes authenticated and authorized applications. The game console 102 may be optimized for executing game programs (e.g., having increased processing support for gaming applications, such as physics co-processors, math co-processors, graphics co-processors, higher resolution video output, higher fidelity audio output, etc.), and may omit certain features commonly found on personal computing devices, such as an alphabetic keyboard, internal hardware expansion slots, printer communication port, etc.

Game console 102 may connect to a television or other display (not shown) via A/V interfacing cables 120. A power cable 122 provides power to the game console. Game console 102 may further be configured with broadband network capabilities, as represented by the cable or modem connector 124 to facilitate access to a network, such as the Internet. Connector 124 may also be fitted with a wireless adapter to connect to one or more wireless networks.

Each controller 104 may be coupled to the game console 102 via a wire or wireless interface. In the illustrated implementation, the controllers are USB (Universal Serial Bus) compatible and are connected to the console 102 via USB cables 130. Controller 102 may be equipped with any of a wide variety of user interaction mechanisms. As illustrated in FIG. 1, each controller 104 may be equipped with two thumbsticks 132(1) and 132(2), a D-pad 134, buttons 136 (e.g., 'A', 'B', 'X', 'Y'), and two triggers 138. The thumbsticks 132 may be analog directional control units, and may include analog potentiometers to detect a degree of position in the X- and Y-coordinates. D-pad 134 may be a directional pad, with inputs for entering directional commands such as up, down, left and right, or combinations of these directions (e.g., upper-left). D-pad 134 may also be analog, and may provide input as to a degree of pressure used to press in a particular direction. These mechanisms are merely representative, and other known gaming mechanisms may be substituted for or added to those shown in FIG. 1.

A memory unit (MU) 140 may be inserted into the controller 104 or game console 102 to provide additional and portable storage. Portable memory units enable users to store game parameters and user accounts, and port them for play on other consoles. In the described implementation, each controller is configured to accommodate two memory units 140, although more or less than two units may be employed in other implementations. A headset 142 may be connected to the controller 104 or game console 102 to provide audio communication capabilities. Headset 142 may include a microphone for audio input and one or more speakers for audio output.

Gaming system 100 is capable of playing, for example, games, music, and videos. With the different storage offerings, titles can be played from the hard disk drive or the portable medium 108 in drive 106, from an online source, or from a memory unit 140. For security, in some embodiments executable code can only be run from the portable medium 108. A sample of what gaming system 100 is capable of playing include game titles played from CD and DVD discs, from the hard disk drive, or from an online source; digital music played from a CD in the portable media drive 106, from a file on the hard disk drive (e.g., "WINDOWS™" Media Audio (WMA) format), or from online streaming sources; and digital audio/video played from a DVD disc in the portable media drive 106, from a file on the hard disk drive (e.g., Active Streaming Format), or from online streaming sources.

The gaming system 100 may be operated as a standalone system by simply connecting the system to a television or other display. In this standalone mode, the gaming system 100 allows one or more players to play games, watch movies, or listen to music. However, with the integration of broadband connectivity made available through a network interface, the gaming system 100 may further be operated as a participant in a larger network gaming community.

With reference to FIG. 2, an illustrative system for implementing the invention may include any computing device, such as computing device 200. In its most basic configuration, computing device 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 200. Any such computer storage media may be part of device 200.

Device 200 may also contain communications connection(s) 212 that allow the device to communicate with other devices, for example, for networked game play. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 200 may also have input device(s) 214 such as keyboard, mouse, pen, voice input device, touch input device, joystick, game controller, etc. Output device(s) 216 such as a display, speakers, printer, etc. may also be included. All these devices are well know in the art and need not be discussed at length here.

Figure 3:
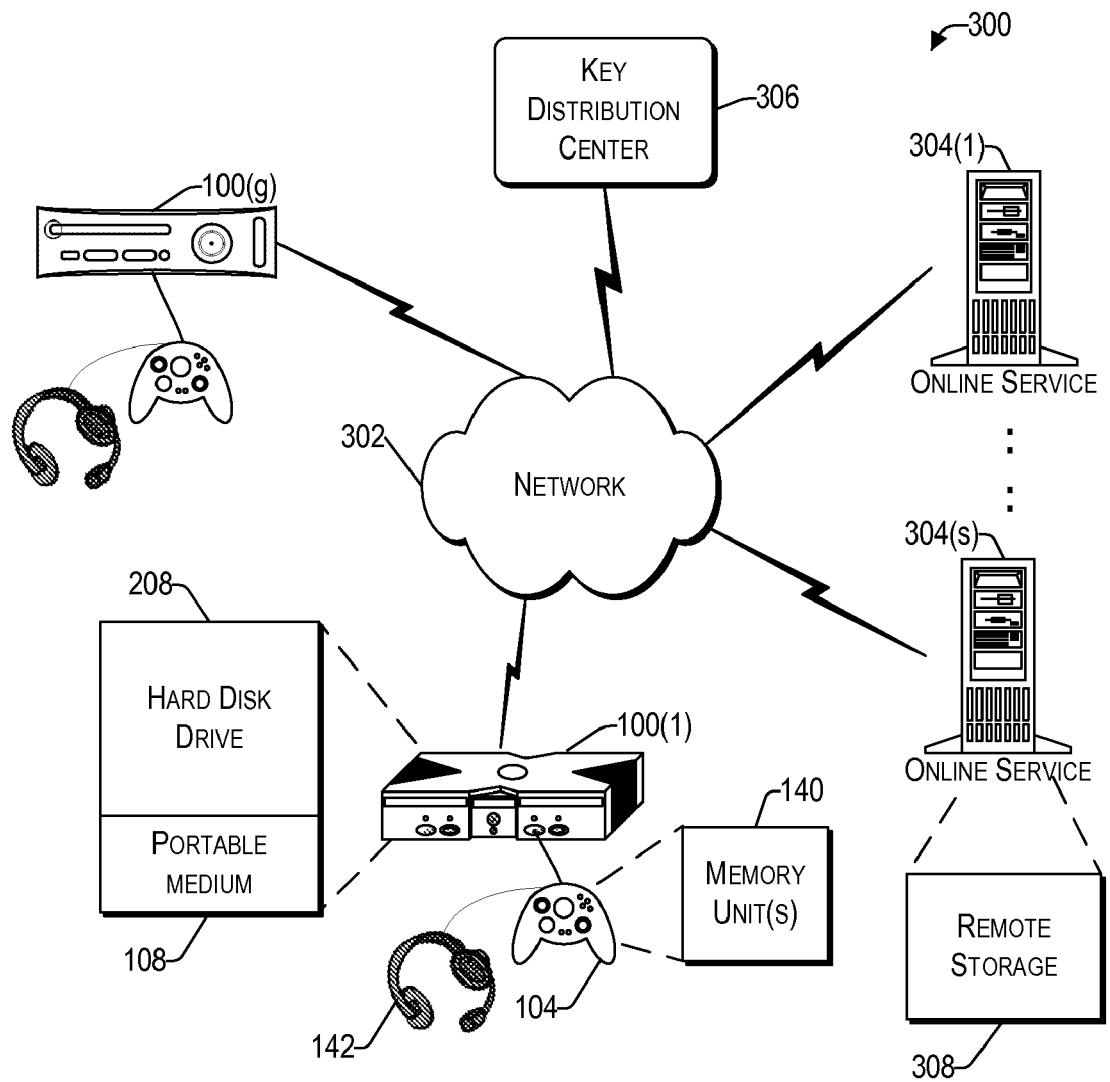
FIG. 3 illustrates an example network configuration over which various aspects of the invention may be performed.

FIG. 3 shows an exemplary network gaming environment 300 that interconnects multiple gaming systems 100(1), . . . , 100(g) via a network 302. Gaming systems 100(1), . . . , 100(g) may include, e.g., Xbox game consoles and Xbox 360 game consoles available from Microsoft Corporation, among other game systems. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), . . . , 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100-online storage. In addition to the portable storage medium 108, the removable storage 208, nonremovable storage 210, and the memory unit(s) 140, the gaming system 100(1) or data processing system 200 can also access data files available at remote storage locations via the network 302, as exemplified by remote storage 308 at online service 304(s).

Illustrative Aspects

Features described herein may be used for a variety of video game types, including, for example, first-person shooter (FPS) games such as PERFECT DARK ZERO™ by Rare, Ltd. of the United Kingdom and Microsoft Corporation of Redmond, Wash. Aspects described herein may also be used with other genres of video games, and are not limited to any one genre or implementation, and may be used with both single player and multiplayer games. Aspects described herein may be implemented in video game application software stored on a computer readable medium, e.g., storage 108, 208, 210, and/or 308, and executable by a data processing device. The video game software may be executed by a data processing device such as system 200 or game console 102. Game console 102 may include, e.g., an Xbox® brand game console by Microsoft Corporation, an Xbox® 360 brand game console by Microsoft Corporation, a Playstation® brand game console by Sony Corporation of Japan, or a Nintendo® brand game console by Nintendo Co., Ltd. of Japan, to name a few. Other game consoles, mobile computing devices, and/or computers may also or alternatively be used.

Various aspects of the disclosure provide new capabilities and features in video games, thereby enhancing game play and providing more options through which players, or gamers, can develop strategies with which to play a video game. According to various aspects described herein, a video game may provide a graphically simulated virtual environment, or virtual world, in which the game takes place, referred to herein as a simulated environment of the video game. The simulated environment may have similar features to actual geographic locations, or may include science fiction or fantasy based environments. The discussion below indicates various features, actions, and items that can be used and/or performed, as applicable, as a player controls a character within the simulated environment.

FIG. 4 illustrates a block diagram of a video game software application 401. Each block in FIG. 4 illustrates a logical software module or function that performs an action, provides a capability or feature, implements an object, or performs some other aspect of the video game. When the video game software 401 executes on a data processing system such as a PC or game console, the modules collectively operate to provide a video game experience to a player operating the PC or game console. The modules illustrated in FIG. 4 are illustrative only, and additional or different modules may be used.

Video game software 401 may include, e.g., a primary game manager module 403, which manages the overall operation of the video game, and may be the initial module launched when the video game is executed. Video game software 401 may also include a network module 405, which manages network game sessions. A network game session may include, e.g., a cooperative campaign with another networked player, a multiplayer match, or other compartmentalized periods of game play involving players located at two network locations. A memory manager module 423 performs memory management during execution of thee video game 401. Input module 407 may receive and interpret user input via a game controller, keyboard, mouse, and the like, and provide the interpreted commands to game manager 403, network manager 405, or other applicable module. UI module 409 may manage and control the user interface, including but not limited to a heads up display displayed on the video output device, interpreting input received via the input module 407, and/or providing tactile feedback via a force feedback controller, and the like. UI module 409 may operate in conjunction with graphics module 411, which renders graphical images of the simulated environment for output and display, and audio module 415, which generates audio signals for output to one or more speakers and/or headsets. Physics engine 413 provides a physics model under which the simulated environment operates, e.g., by defining gravity, inertia, collision reactions, and the like. Physics engine 413 may model "real world" physics, or may alter the physical reality simulated in the video game to provide a desired simulated environment.

Various modules may operate with one or more classes of objects defined and used by video game 401. Such classes and objects may be defined according to an object module 425, and may include portions of executable software code and/or one or more data structures, depending on the object. A first class of objects may define characters in the video game, e.g., data and functions corresponding to each character. Character data may include attributes of the character, e.g., health, strength, speed, etc. Character functions may include actions such as roll, crouch, fire weapon, punch, etc. A second class of objects may define vehicles in the video game. A third class of objects may define equipment (e.g., weapons, simulated computers or PDAs, etc.) in the video game. Vehicle objects and equipment objects may be usable and/or capable of being possessed by character objects. Other classes of objects may be used as well.

AI module 419 defines the artificial intelligence with which one or more computer-controller character objects behave or operate within the video game. A radar module 421 may provide a radar system visible at least to player characters, through which players controlling a player character can identify locations of other characters in the simulated environment of the video game. Radar module 421 is described in further detail below.

Object module 425 may provide an array of weapons and or other usable equipment in the video game. Each weapon or piece of equipment may be defined by an object and instantiated during the game. For example, the video game may include a variety of weapon objects for characters to use in the game. Each weapon may provide varying features, attributes and functions, and provide advantages and disadvantages based on each feature and function. For example, an attribute of a weapon may be the magazine, or clip, size of the weapon (e.g., how many bullets can the weapon fire before reloading), whether the weapon can be damaged and, if so, what is the "health" of the weapon. Other attributes of the weapon may include damage that the weapon may cause, visual effect in use, effect on radar, etc. Alternatively, weapon objects may use or may include projectile objects, which can be fired by a weapon object. Damage may then be associated with a projectile object instead of or in addition to being associated with a weapon object.

Weapon objects may also define functions, e.g., defining alternate modes of operation, including primary, secondary and/or tertiary functions. The objects may include, for example, different portions of executable code triggered by predefined user inputs, such as the user pressing a trigger key or button while in a predetermined game state. Various pistols may fire bullets in a primary mode, and have alternate secondary and/or tertiary modes by entering different inputs and/or in different game states (e.g., toggling a weapon from one firing mode to another). According to an illustrative embodiment, a video game may provide a first pistol object (Pistol 1) that fires bullets, and has a secondary function whereby the pistol fires in a silenced mode, and a tertiary mode operating a flashlight. A second pistol object (Pistol 2) may have a second function whereby the pistol expels a clip, which then fires each round in sequence from wherever the clip lands (similar to a firecracker). Video game 401 may also provide additional and/or alternative weapons. A third pistol object (Pistol 3) may provide a secondary function of a decoy bullet, further described below. A fourth pistol object (Pistol 4) may provide a secondary function of a ricochet bullet, whereby a bullet bounces off walls and objects, as defined by the physics engine 413. A fifth pistol object (Pistol 5) may fire a tranquilizer bullet in a primary mode, and a psychosis bullet in a secondary mode. The psychosis bullet, operating to hinder a player's ability to distinguish friends from foes, is described in more detail below. Each pistol may have a magazine of bullets, and each magazine may differ in number between pistols.

Video game 401 and object module 425 may further provide heavy assault weapon objects. A first heavy assault weapon object (Heavy 1) may provide a large magazine of bullets in a primary mode, and in a secondary mode may fire mini mines that slow down personnel and/or stop vehicles. A second heavy assault weapon object (Heavy 2) may fire a plasma projectile in a primary mode, and provide a cloaking device in a secondary mode. A third heavy assault weapon object (Heavy 3), may fire rockets in a primary mode, and fire guided missiles in a secondary mode.

Video game 401 and object module 425 may further provide machine gun weapon objects. A first machine gun object (Machine Gun 1) may provide a magazine of bullets in a primary mode, fire with a silencer in a secondary mode, and provide a flashlight in a tertiary mode. A second machine gun object (Machine Gun 2) may provide a magazine of bullets in a primary mode, and may deploy a booby trap in a secondary mode (the booby trap may explode when another character nears the booby trap in the simulated environment). A third machine gun object (Machine Gun 3) may provide a magazine of bullets in a primary mode, and create a duplicate character image, or hologram, in a secondary mode. The duplicate image function is described in more detail below. A fourth machine gun object (Machine Gun 4) may provide a magazine of bullets in a primary mode, provide a threat detector in a secondary mode, and reprogram enemy devices in a tertiary mode so that the enemy devices are usable by the character object having possession of a machine gun 4 object. For example, an instance of a vehicle object may have a data value identifying a team to which the vehicle object corresponds in a multi-team match. Only character objects on the appropriate team can activate that vehicle object. However, a character object on a different team and having possession of a machine gun 4 object may activate the machine gun 4 object in the tertiary mode to "hotwire" the vehicle object. Once hotwired, the vehicle may be usable by any team, or may be usable only by members of the team corresponding to the character object that hotwired the vehicle in the first place.

Video game 401 and object module 425 may further provide rifle weapon objects. A first rifle object (Rifle 1) may provide a magazine of bullets in a primary mode, and fire a bayonet in a secondary mode. A second rifle object (Rifle 2) may provide a magazine of bullets in a primary mode, and fire grenades in a secondary mode. A third rifle object (Rifle 3) may provide a magazine of bullets and/or grenades in a primary mode, fire bounce-able grenades in a secondary mode, and provide night vision to a possessing character object in a tertiary mode. A fourth rifle object (Rifle 4) may provide a magazine of bullets in a primary mode, and turn into a stationary sentry gun in a secondary mode, shooting anyone within proximity to the sentry gun in the simulated environment.

Video game 401 and object module 425 may further provide sniper weapon objects. A first sniper object (Sniper Rifle 1) may provide a magazine of bullets in a primary mode, and fire a radar jamming projectile or device in a secondary mode. Radar jamming features of the Sniper Rifle 1 object are described in more detail below. A second sniper object (Sniper Rifle 2) may provide a magazine of simulated particle bullets in a primary mode, and provide x-ray vision to a possessing character object in a secondary mode.

Video game 401 and object module 425 may further provide other weapon and equipment objects. For example, a shotgun object (Shotgun 1) may provide a magazine of shotgun shells in a primary mode, a radar sweep function in a secondary mode, and a radar mimic function in a tertiary mode. The radar mimic function is described in more detail below. A sword object may cause damage by a possessing character object when a primary slash function is performed in proximity to another character, and may provide a deflection function in a secondary mode.

While a player's character is using a specific weapon object, the player can provide predetermined inputs using any of the aforementioned input devices (e.g., game controller, joystick, keyboard, mouse, etc.) to fire the weapon in a default mode (to perform the primary function), secondary mode (to perform the secondary function), and tertiary mode (to perform the tertiary function—if applicable). For example, a player may press and release a primary input button (e.g., the right trigger of a controller 104) to fire the weapon in the default or primary mode of operation, press and release a secondary button (e.g., the right bumper button) to fire the weapon in or use the secondary mode, and press and hold the secondary button to fire the weapon in or use the tertiary mode operation.

Video game software 401 may include other software modules 427, as needed. FIG. 4 is illustrates but one possible software architecture that may be used. Each module depicted in FIG. 4 may communicate directly or indirectly with each other module, e.g., by passing objects, data, parameters, input, output, etc.

FIG. 5A illustrates a block diagram of an instance 501 of an object. Object instance 501 has an object type 503 (player character), and an object class 505 (character). Instance 501 may inherit one or more attributes 507 from object type 503 and/or object class 505. Attributes 507, when examined, define a state of the instance. In this example, because instance 501 is a Player Character object, instance 501 has an associated player attribute 511 (Aviator). The associated player may correspond to an input device connected to the game playing device on which the video game is being played, a user name on a network gaming service such as XBOX LIVE® (the game playing device may separately associate the user name with a specific controller or input device connected to the game playing device), or any other identifier or feature that uniquely identifies a human video game player providing input to video game 401. Instance 501 may also have various other attributes, for example, name 513, health 515, radar mode 517, psychosis flag 519, hologram flag 521, and team 523.

Instance 501 may inherit methods 509 based on the object type 503 and/or class 505. Each method can be performed by instance 501, and collectively define the capabilities or actions that instance 501 can perform. In this example, because instance 501 is a character, instance 501 may inherit methods such as roll 525, crouch 527, punch 529, primary action 531, secondary action 533, tertiary action 535, use equipment 537, and possess 539. Each action may perform a corresponding action, e.g., as explained by the method names.

FIG. 5B illustrates a block diagram of an instance 551 of an object. Object instance 551 has an object type 553 (Machine Gun 3), and an object class 555 (weapon). Instance 551 may inherit one or more attributes 557 from object type 553 and/or object class 555. Attributes 557, when examined, define a state of the instance. In this example, because instance 551 is a Machine Gun 3 object, instance 551 has an associated primary ammo remaining attribute 561 (16 rounds remaining), secondary ammo remaining attribute 563 (15 seconds), and hologram state 564 (off). Instance 551 may also have other attributes, such as primary sound level 565 (indicates a noise level associated with performing a primary trigger pull) and secondary sound level 566 (indicates a noise level associated with performing a secondary trigger pull).

Instance 501 may inherit methods 559 based on the object type 553 and/or class 555. Each method can be performed by instance 551, and collectively define the capabilities or actions that instance 551 can perform. In this example, because instance 551 is a Machine Gun 3 object, instance 551 may inherit methods such as primary trigger pull 567 (indicates when a character possessing instance 551 is performing a primary action), secondary trigger pull 569 (occurs when a character possessing instance 551 is performing a secondary action), fire bullet 571 (results from a primary trigger pull 567), and toggle hologram (results from a secondary trigger pull 573). Each action may perform a corresponding action, e.g., as explained by the method names.

Thus, for example, player character instance 501 may perform the Possess method 539 on a weapon object, such as instance 551 of Machine Gun 3, to equip that weapon. While "possessing" Machine Gun 3, instance 501 may perform secondary action method 533 (e.g., based on appropriate user input), thereby causing instance 551 to perform secondary trigger pull 569. Instance 551 then performs the Toggle Hologram method, causing the Hologram attribute 564 to toggle between on and off. This is but one example, and other classes, objects, instances, attributes, methods, and/or other data may be used to implement the video game features described below.

For ease of understanding, aspects may be described below in a manner such as "when a first player character aims and fires a weapon at a second character." This descriptive methodology may refer to a player character object performing a primary, secondary, and/or tertiary action method, causing the weapon object to perform a corresponding primary, secondary, and/or tertiary trigger pull, resulting in the weapon object performing another method corresponding to the appropriate trigger pull method. Similar and/or alternative interpretations are readily understood based on the various descriptions below.

Figure 6:
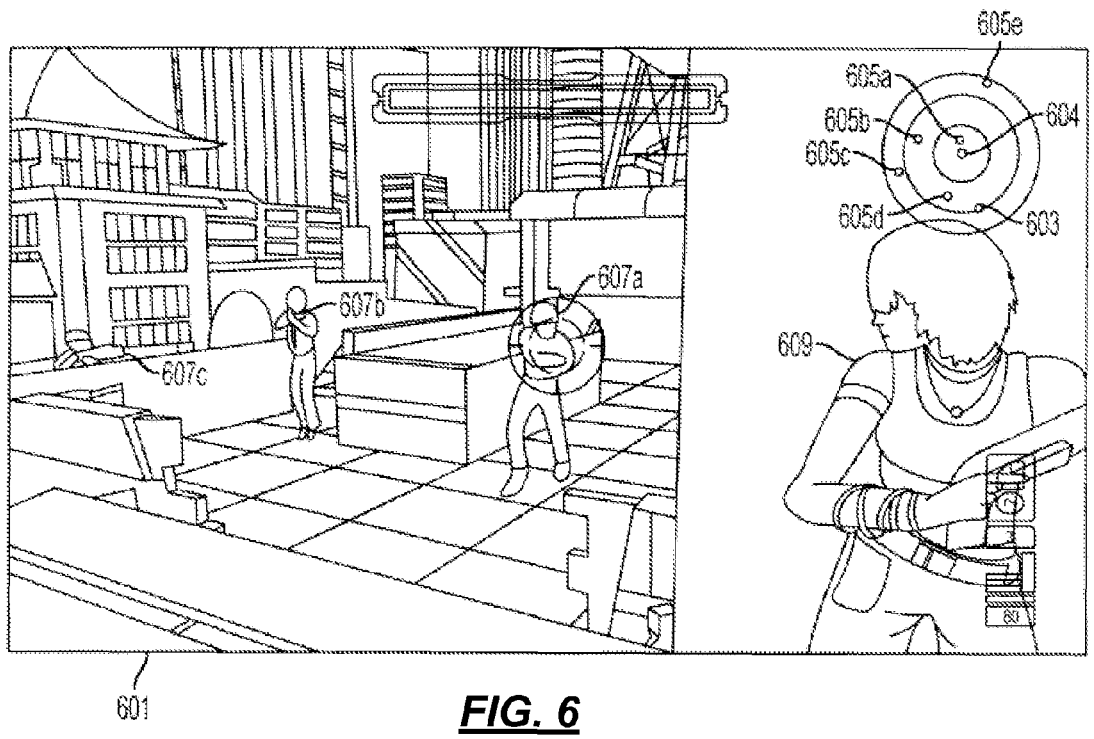
FIG. 6 illustrates a screenshot of a video game implementing one or more illustrative aspects described herein.

According to an illustrative aspect, with initial reference to FIG. 6, a FPS video game 401 may provide a radar 603 with which a player can determine the location of nearby enemies. FIG. 6 illustrates a screenshot 601 of the FPS shooter video game PERFECT DARK ZERO® by Rare, Ltd. and Microsoft Corporation. Radar 603 provides locations of other characters in the video game 401 relative to player character 609. Player character 609 represents the character (e.g., instance 501) controlled by the player or user of the video game, whereas other characters in video game 401 may include friendly, neutral, and/or enemy player characters and/or computer-controlled characters. In FIG. 6, radar 603 illustrates radar blips 605a, 605b, and 605c representing locations corresponding to enemy characters 607a, 607b, and 607c, respectively. Radar 603 also illustrates radar blips 605d and 605e corresponding to enemy characters not visible in the screenshot of FIG. 6, and thereby not directly visible to player character 609. As used herein, a radar 'blip' refers to any visual indication or symbol on a radar screen to indicate a position of a second character relative to the position of a first character, where the first character is generally (but not necessarily) the user or owner of the radar.

Radar 603 may be oriented such that the position 604 of the player character 609 is always in middle of the radar 603, and the remainder of the radar is based on a current orientation of the player character 609. Radar 603 may provide a top-down view of the level, where portions of the radar above the center represent areas of the simulated virtual environment in front of the player character 609, and portions of the radar below the center represent areas of the simulated virtual environment behind the player character 609. Other radar implementations may be used instead. For example, the radar may be statically oriented, where the player character's position remains in the middle, but the radar is fixed where the top represents North, the bottom represents South, the right represents East, and the left represents West. Still alternatively, the radar may remain fixed as to a geographic area, and the player character's position is not fixed to the center of the radar. Instead, as player character 609 moves around the simulated virtual environment, the blip 604 corresponding to player character 609 moves correspondingly around radar 603. Other characters in the game are illustrated in radar 603 relative to the current position of player character 609.

Video game 401 may use various criteria to determine whether to include or exclude other characters, in proximity to character player 609 in the simulated environment of the video game, from illumination on radar 603. For example, video game 401 may illuminate on radar 603, without distinguishing friend from foe, any character within the range of the radar 603. Alternatively, radar 603 may illuminate friendly characters in a first visual appearance or color, e.g., green, and may illuminate enemy characters in a second visual appearance or color, e.g., red. Video game 401 may illuminate characters on radar 603 based on movement of each character. For example, when a character moves, that character appears on radar. But if a character remains still, the character is not displayed on the radar.

Acoustic Radar

According to one illustrative aspect, video game 401 may illuminate characters on radar 603 based on a simulated acoustic signature or simulated noise level associated with each character in the simulated environment of video game 401. In general terms, when the character makes noise within the simulated environment of video game 401 (e.g., when a weapon object defines an audible range, as a noise level or distance, for a function being used), that character appears on radar 603 of other players that are within the audible range. For those characters not within the range of radar 603, video game 401 may optionally display an indication on the periphery of radar 603 indicating a general direction of the noise-making character without identifying an exact location. Such a radar may then be an acoustic radar.

Video game 401 may determine when and how long to include a character on radar 603 based on various factors. The appearance of a character on radar may be based on an approximation of how loud the character is, or how loud of a weapon the character is using. The louder the simulated noise level, the more likely the character is to appear on radar. Also, louder simulated noise levels may result in a character appearing on radar for longer periods of time than lower simulated noise levels. For example, a character might not appear on acoustic radar 603 until the character produces a sound above a minimum sound threshold. The game 401 may include an identification of a maximum audible distance for each weapon, where firing the weapon will appear on an another character's radar only if that character is within that maximum audible distance from the fired weapon. Audible distance may be implemented in a variety of ways, such as by using an attribute of weapon objects, by use of a lookup table, or may be identified using some other defined function.

The length of time that a character remains on acoustic radar 603 may depend on the noise level or loudness of the sound produced by that character. Sounds may be produced, e.g., by walking noisily, shooting various weapons, and talking, among other things. Thus, if a first character walks through simulated glass, the noise might cause the character to appear on a second character's radar. However, the video game may provide alternative modes where characters may be able to reduce the noise they produce, thereby precluding their inclusion on another character's radar. For example, if a first character is in a 'crouch' mode or otherwise walking slowly, and thus is walking stealthily, the first character might not appear on the second character's radar, even when walking through glass or some other noisy material or environment. The crouch mode may be identified by a Crouch toggle attribute (not shown) associated with character objects.

Similarly, if a first character speaks in the simulated environment of video game 401, the first character might appear on a second character's radar. However, characters may be able to reduce the noise they produce, thereby precluding their inclusion on another character's radar. For example, if the first character is in a hand signal or whisper mode, or otherwise talks softly, the first character might not appear on the second character's radar, even when communicating with other characters. The whisper mode may be identified by a Whisper toggle attribute (not shown) associated with character objects.

Appearance on an acoustic radar might also depend on actual noise levels of communicating players. For example, in a multiplayer match, teammates may verbally communicate and talk with one another using headsets 142. Video game 401 (e.g., input module 407 and/or audio module 415) may monitor decibel levels or other audio/sound levels of such communications and, when such conversations are above a minimum threshold level, the character corresponding to the speaking player may appear on other proximately located characters' acoustic radar. The software modules may include a data structure identifying one or more threshold levels, with a predetermined audible range associated with each level, such that different sound levels may be detected at different ranges.

If a first character fires a weapon in the simulated environment of video game 401, the first character might appear on a second character's radar. However, characters may be able to reduce the noise they produce, thereby precluding their inclusion on another character's radar. For example, if the first character fires the weapon in a silenced mode or otherwise muffles the sound of the weapon, the first character might not appear on the second character's radar, or might appear for a lesser amount of time than the character otherwise normally would appear as a result of firing that weapon. According to one illustrative aspect, because different weapons produce different amounts of noise, the length of time for which a character appears on radar might be proportional to or based on the amount of noise the weapon produces. That is, if a character fires a silenced weapon, the character might not appear on radar at all. If the character fires a pistol, e.g., a Pistol 1 object, the character might appear on radar for a relatively short amount of time, e.g., five seconds. If the character fires a rifle, e.g., a Rifle 1 object, the character might appear on radar for a longer amount of time, e.g., eight seconds. If the character fires a heavier weapon, e.g., a Pistol 3 object, the character might appear on radar for yet a longer amount of time, e.g., ten seconds. Table 1, below, illustrates radar signatures, or simulated noise levels, for the various weapons described above, according to an illustrative embodiment. The values in Table 1 may represent Sound attribute values of weapon objects.

TABLE 1

| Name | Time on Radar (Primary Sound) | Time on Radar (Secondary Sound) | Time on Radar (Tertiary Sound) |
| --- | --- | --- | --- |
| Pistol 1 | 5 | 0 | n/a |
| Pistol 2 | 5 | 5 | n/a |
| Pistol 3 | 5 | 5 | n/a |
| Pistol 4 | 10 | 10 | n/a |
| Pistol 5 | 0 | 0 | n/a |
| Heavy 1 | 5 | n/a | n/a |
| Heavy 2 | 5 | n/a | n/a |
| Heavy 3 | 5 | 5 | n/a |
| Machine Gun 1 | 5 | 0 | n/a |
| Machine Gun 2 | 8 | 8 | n/a |
| Machine Gun 3 | 5 | n/a | n/a |
| Machine Gun 4 | 5 | n/a | n/a |
| Rifle 1 | 8 | 8 | n/a |
| Rifle 2 | 8 | 0 | 0 |
| Rifle 3 | 5 | 5 | n/a |
| Rifle 4 | 7 | 7 | n/a |
| Blade 1 | 0 | 0 | n/a |
| Shotgun | 5 | n/a | n/a |
| Sniper Rifle 1 | 5 | 5 | n/a |
| Sniper Rifle 2 | 5 | 5 | n/a |

In addition to the above weapons, handheld or thrown weapons may also produce a radar signature, and may have weapon object data and attributes as described above with other weapons. For example, a grenade may produce a 5 second radar signature at the location of detonation of the grenade, or at the location from which the grenade was thrown. A flashbang grenade may produce a similar radar signature, e.g., 5 seconds. A boomerang weapon may also produce a radar signature, e.g., 5 seconds. The times listed above and in Table 1 are illustrative only, and other times may be used instead.

Each time an instance of an object performs a method that has an associated sound level, simulated noise level, acoustic signature, or other noise producing event and/or attribute associated with it, the object may register the event with radar module 421. Radar module 421, in turn may manage a database of reported noises with corresponding radar signatures and noise locations. The radar signature may include an indication of a player or team creating the noise. Each entry or event in the radar module database may expire after a predetermined amount of time based on the simulated noise level or Sound attribute. Radar objects associated with characters may subsequently query or poll radar module 421 for noise events. The query may or may not include a current location of a character corresponding to the radar object. Radar module 421 returns query results to the radar object. The query results may include only noise events within a predetermined distance of the location of the character, where a location is included in the query. Alternatively, radar module 421 may independently identify the character, and provide only relevant noise events. Radar module 421 may alternatively provide all noise events. The radar object then causes UI module 409 or graphics module 411 to display appropriate visual displays on radar 603.

Figure 7:
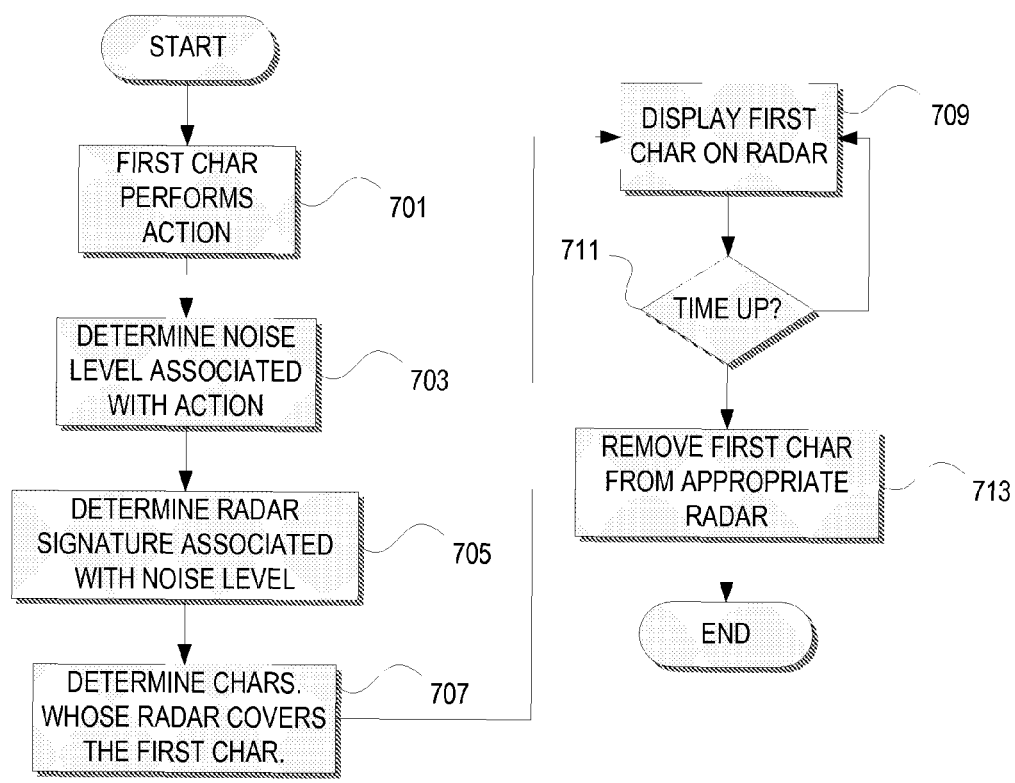
FIG. 7 illustrates a method for an acoustic radar in a video game according to one or more illustrative aspects described herein.

FIG. 7 illustrates a flowchart for an illustrative method of displaying characters on an acoustic radar. In step 701 a first character performs some action which makes some noise in the simulated environment of video game 401. The action may include speaking or other vocal noise, firing a weapon, and/or otherwise interacting with the simulated environment (e.g., breaking glass, etc.). In step 703 video game 401 determines a simulated noise level associated with the action. For example, video game 401 may use a lookup table or noise level function to determine a simulated noise level associated with the action. Video game 401 may alternatively refer to a corresponding Sound attribute of the character, weapon, equipment, or other object causing the sound to occur. That is, sound levels may be hard-coded. Video game 401 may alternatively refer to an acoustic or simulated noise level associated with a class or object type, if a noise level is not defined in an instance of an object. The simulated noise level may be generated in other manners as well. In step 705, based on the simulated noise level, video game 401 determines a radar signature associated with the noise level. The radar signature may include a size of a blip, or radar image, to display on a radar, a blip color, and/or a blip duration (i.e., the length of time the blip appears on radar). The radar signature may include additional or different information as well, such as a blinking pattern to indicate a specific action performed by the first character (e.g., using a specific weapon, blowing up a bomb, or providing a specific audible signal). The radar signature may be defined as attributes to an object instance, type, and/or class, or may be determined by a radar object based on various received inputs, including a value of a team attribute, an object type and/or class, etc.

In step 707 the video game 401 determines whether the first character is within the radar range of any other characters. Location may be determined by comparing a location attribute (not shown) of each instance of a character object. Video game 401 uses location information to determine whether the radar signature should appear on any other character's radars. In step 709 the video game 401 displays the radar signature on the radar of all characters whose radar range covers the first character. The radar signature is displayed on each radar in a location corresponding to the first player's location in the simulated environment of the video game relative to the player on whose radar the radar signature is displayed, and the radar signature may be displayed with the designated color, blink pattern, duration, etc. In step 711, the radar signature is displayed for the designated amount of time and with the designated appearance corresponding to the noise level and/or radar signature, and then in step 713 the radar signature is removed from the relevant characters' acoustic radar.

While the radar signature of the first character is being displayed on other characters' radars, the position of the first character may or may not be updated on radar. In a first variant, the position of the first character is not updated after being displayed on others' radar. In this first variant, the radar signature is associated with the location of the sound, and thus the radar blip may remain, e.g., for 5 seconds, in a constant location, regardless of whether the first character moves after creating the noise. In a second variant, the radar blip corresponding to the first character moves correspondingly to the first character's movement as long as the radar blip remains on other characters' radar. Thus, while the noise created by the first character causes the first character to appear on others' radar, the resultant radar blip tracks subsequent movement of the first character as long as the radar blip is being displayed.

Other variations and modifications may be made to the method illustrated in FIG. 7 without departing from the present disclosure. For example, some steps in FIG. 7 may be optional, steps may be combined, rearranged, and/or steps may be split up one or more separate steps. For example, step 703 and/or 705 may be optional where each action is directly associated with a radar signature or simulated noise level. As another example, step 707 may be performed at any time prior to step 709. Also, subsequent actions by the first character may supersede a previously determined radar signature. For example, if the first character fires a pistol, resulting in a five second radar signature, and one second later fires a rifle, resulting in an eight second radar signature, the first character may actually appear on other characters' radar for nine seconds.

Features of acoustic radar described herein provide additional information and strategy options to video games. That is, when more powerful weapons have larger radar signatures, smaller and quieter weapons become more desirable to offensive players wanting to remain undetected or less detected. From a defensive perspective, features of the acoustic radar give players a capability to detect an enemy and to determine what type of weapon the enemy is using.

Decoy Bullet

As indicated above, a first person shooter game according to various aspects described herein provides a variety of weapons for players to use in each game. Each weapon may provide various features and functions, and provide advantages and disadvantages based on each feature and function. According to one aspect, a weapon (e.g., Pistol 3 objects) may provide a method (e.g., a primary, secondary or tertiary function) that fires a decoy bullet or some other projectile, energy beam, or the like. While a player's character is holding, or Possessing, the weapon, the player may provide input, e.g., via controller 104, to cause the Pistol 3 object to fire a decoy bullet instead of a regular bullet. A decoy bullet deceives other players/characters as to the firer's true position by manipulating the acoustic radar. When a player's character fires a decoy bullet, the bullet (or other projectile) is fired from the weapon as if the weapon has a silencer. Thus, the firer does not appear on other characters' radar based on the location from which the decoy bullet was fired. The projectile instead makes noise at the location of first impact in the simulated environment of the video game. The report (i.e., explosive noise or sound resulting from firing a weapon) that would ordinarily originate from the location of firing instead originates from the location of the first obstacle in the path of the bullet or projectile fired from the weapon, thus causing a radar blip based on the location of impact. The character thus appears on acoustic radar as if he or she is at the location of impact of the projectile. The character thus appears on others' radar(s) at a false location. If another character is hit by the decoy bullet, the decoy bullet may or may not cause damage, or may cause more or less damage than an ordinary bullet (i.e., a bullet fired in the default mode of the weapon).

According to an aspect, video game 401 may provide for a class of objects whose acoustic signature or simulated noise level is represented differently than other classes. A decoy bullet object may be one such object. Such a class of objects may include a noise location attribute indicating that noise occurs at a location of impact of the decoy bullet object in the simulated environment of the video game 401. A "regular" bullet object might include a noise location attribute indicating that noise originates from a location of firing, e.g., as defined by a character object Possessing the weapon object from which the regular bullet object was fired.

Figure 8:
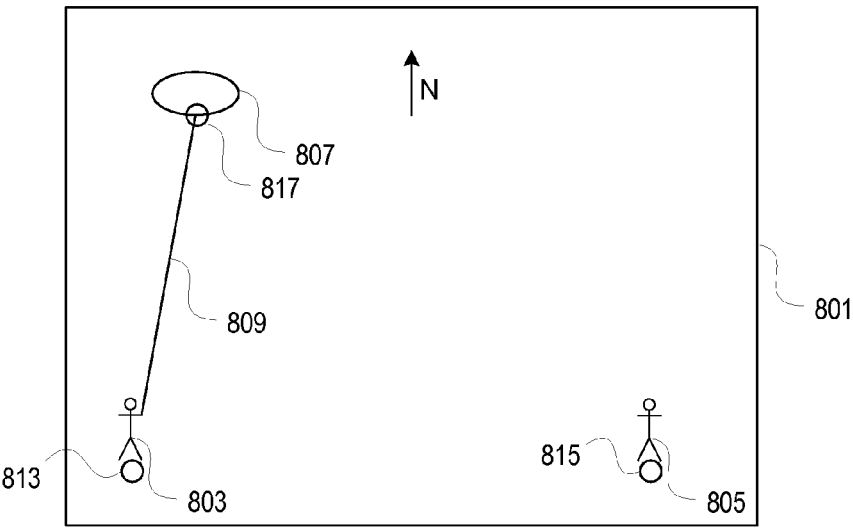
FIG. 8 illustrates an overhead view of a portion of simulated virtual environment of a video game according to one or more illustrative aspects described herein.
Figure 9A:
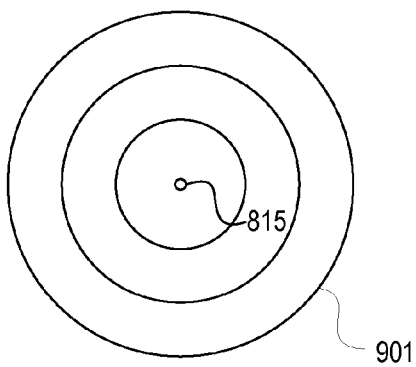
FIG. 9A and FIG. 9B illustrate acoustic radar images in a video game according to one or more illustrative aspects described herein.
Figure 9B:
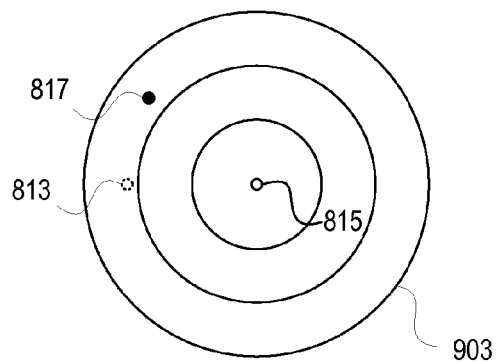
Figure 10:
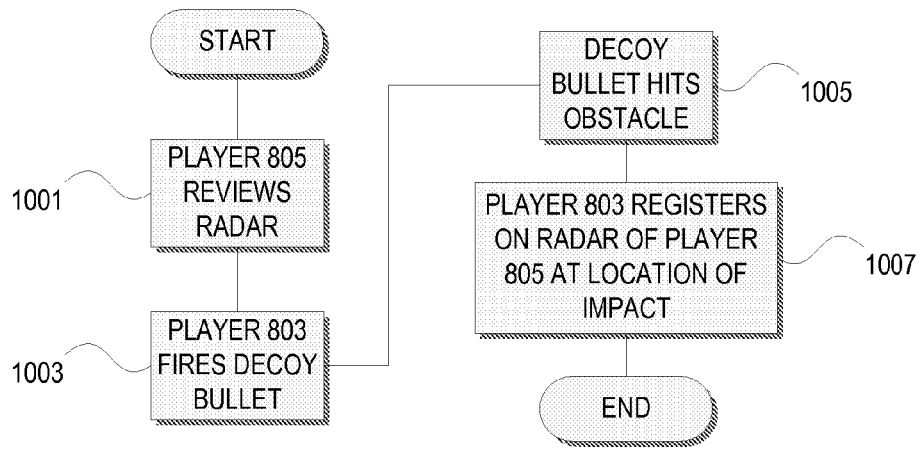
FIG. 10 illustrates a method for using a decoy bullet in a video game according to one or more illustrative aspects described herein.

FIG. 8, FIG. 9, and FIG. 10 illustrate the firing of a decoy bullet, the report originating from a location other than the firing character's position, and the resultant effect on another character's acoustic radar. FIG. 8 illustrates an overhead view of a portion of a simulated environment 801 in a video game 401. Two opposing player characters 803 and 805 are located at positions 813, 815, respectively. The southerly face of obstacle 807 is located at position 817. FIG. 9A illustrates an initial radar image 901 of an acoustic radar corresponding to player 805 (facing north) before player 803 fires a decoy bullet. FIG. 9B illustrates a resultant radar image 903 of the acoustic radar corresponding to player 805 (facing north) after player 803 fires a decoy bullet along trajectory 809 (i.e., from position 803 toward obstacle 807). FIG. 10 illustrates a process of firing a decoy bullet and resultant effects within an illustrative video game.

In step 1001, player 805 reviews her radar image 901, which presently does not indicate the presence of any nearby characters in the simulated environment of video game 401. In step 1003, player 803 fires a decoy projectile (e.g., a decoy bullet object resulting from a secondary trigger pull method of a Pistol 3 object) along trajectory 809 in the simulated environment of video game 401. The projectile (decoy bullet object) and weapon (Pistol 3 object) from which it was fired do not register any noise at location 813 with any radar objects, based in the weapon firing a decoy projectile, and thus do not register on any other characters' radar from location 813.

In step 1005, the decoy bullet object (as may be calculated by the physics engine 413) impacts an obstacle, here the southern edge of obstacle 807 at location 817, at which location the bullet report occurs. That is, decoy bullet object may register a corresponding sound level attribute at the location of impact with radar module 421. If a third player were standing near location 817, that third player may hear player 803 firing Pistol 3, but the sound may originate as if pistol were fired from location 817 instead of location 813. For example, the object corresponding to the third player queries radar module 421 for any registered items, and radar module 421 reports the noise corresponding to the weapon object at a location corresponding to the location of impact. If desired, the game may also generate a sound of impact at location 817, e.g., generated by the decoy bullet object. In step 1007, player 803 illuminates on the acoustic radar of player 805 at the location 817 of impact of the decoy projectile, as illustrated in FIG. 9B and radar image 903. Player 805 thus believes that a weapon was fired from location 817. Location 813, illustrated in broken lines in FIG. 9B, is for comparison purposes only, and represents the actual location of player 803. Location 813 is not actually displayed on radar image 903 as visible by player 805, thereby illustrating that player 803 can deceive player 805 by appearing in a false location on the radar of player 805.

Variations and alternatives are possible. For example, the use of a decoy projectile might be more "expensive" than firing a regular projectile. A character might expend an entire bullet magazine to fire a single decoy bullet, and thus must wait to reload after firing the decoy bullet, whereas a bullet magazine might otherwise fire multiple (e.g., 6 or 9) regular bullets. The cost of using this feature may be reflected in the weapon object for that weapon. The character must therefore make a strategic decision when to use decoy bullets versus when to fire regular bullets. In another variation, the decoy bullet might fire an entire magazine in a single shot, and the bullets in the magazine may fire randomly from the location of impact, thereby also falsely reporting the location of the firer, but for a longer period of time. In such a variation, the noise from 6 (or however many bullets are in a magazine) might cause the falsely reported location to persist longer on others' radar.

According to another alternative, a player character may throw a decoy grenade. Upon throwing a decoy grenade, the decoy grenade may cause the character to appear on relevant radar based on the location at which the grenade detonates, rather than the location from which the grenade was thrown. Another variation includes the planting of a decoy mine. A first player character plants a decoy mine. When the decoy mine is activated, e.g., based on a timed delay or based on another character activating, or "tripping," the mine, the first player character appears on relevant radar based on the location of the decoy mine, rather than the current location of the first player character Radar Jamming According to another aspect, a weapon object may provide a method, such as a default, secondary, or tertiary function, to jam an opponent's radar. That is, a player character's radar may have a default state being a Normal state (see, e.g., FIG. 5A), whereby the corresponding radar object identifies other character's locations relative to the location of the player character. When a first player character aims and fires the weapon at a location within a predetermined distance from a second character (e.g., hitting the second character with a beam or projectile) in the simulated environment of the video game, the radar (acoustic or otherwise) of the second character may be permanently or temporarily placed into a jammed state, e.g., by changing the radar attribute to a Jammed state. While a character's radar attribute is Jammed, a radar object corresponding to that character displays no radar information regarding other characters, regardless of whether other characters would appear were the radar attribute in the Normal state. The duration of jamming may be any predetermined amount of time (e.g., 5 seconds, 10 seconds, permanent, etc.), and may depend on how close the weapon was aimed to the second character, may depend on the distance of the first player character to the second character when the first player character fired the weapon, or may depend on a host of other factors. Such factors may be included in lookup tables, databases, object attributes, determination functions, and the like.

According to various aspects, a character might only be able to jam any other character's radar once within a predetermined time period. For example, a weapon object might have an Inhibit Jamming method, which is automatically called upon activation of a Jam_Radar method of the same weapon object. The Inhibit_Jamming method may toggle a Can_Jam attribute to NO for some predetermined amount of time, and then toggle the Can_Jam attribute back to YES after expiration of that predetermined amount of time. Similarly, when that weapon object calls the Jam_Radar method, the method checks the Can_Jam attribute, and only executes if the Can_Jam attribute is presently set to YES.

Alternatively, after a first character's radar has been jammed, that first character might be immune from having her radar jammed again for some specified period of time. In such an alternative, the character object or radar object corresponding to the first character might include the Can_Jam attribute. When a second character attempts to jam the radar object corresponding to the first character, the radar object polls the Can_Jam attribute and, if set to YES, calls the Jam_Radar method. If set to NO, the radar object does not call the Jam_Radar method, or if the polling is performed from the Jam_Radar method, exits without changing the radar mode attribute to Jammed.

According to another aspect, a first character whose radar is presently jammed might automatically appear on all other characters' radar, regardless of whether the first character would normally appear on the other characters' radar. For example, if the video game uses an acoustic radar, the first character whose radar is jammed may be "lit up" and appear on all other relevant characters' radar, regardless of whether the first character is firing a weapon or making any noise. In such an aspect, the first character's radar object may register a noise event with radar module 421, having a location corresponding to the first character, and having a noise level or duration corresponding to the length of time the radar is jammed.

Figure 11:
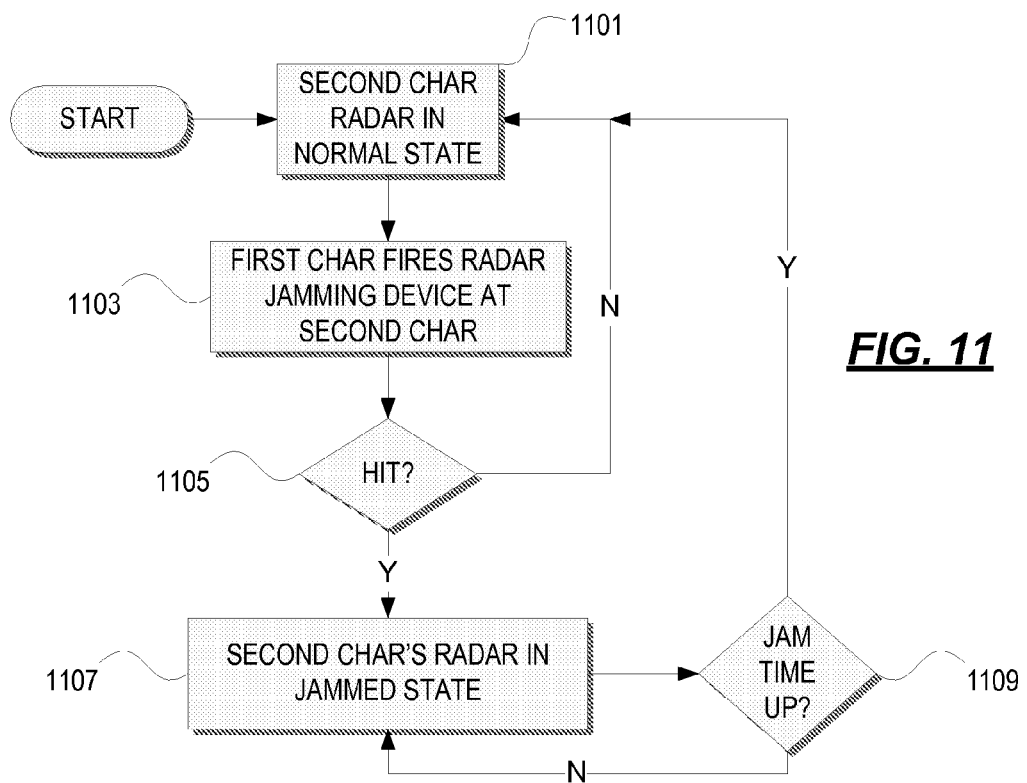
FIG. 11 illustrates a method for performing radar jamming in a video game according to one or more illustrative aspects described herein.

FIG. 11 illustrates a method of jamming a player's radar. In step 1101 a second character's radar is in a Normal operation state. In step 1103 a first character aims and fires a weapon (or some other device) at the second character while the weapon is in a radar jamming mode (e.g., a primary, secondary, or tertiary action is performed to cause the weapon object to perform a Jam_Radar method). In step 1105 video game 401 determines whether the first player's shot is considered a hit on the second player, based on whatever criteria the video game 401 uses to determine whether one player hits another player. For example, the physics engine 413 may calculate a trajectory of the projectile, and determine whether the projectile strikes another player. If the shot is considered a hit, then in step 1107 the video game places the second player's radar into a jammed state for a predetermined amount of time, e.g., 5 seconds (the step may also include an optional step of checking the second player's Can_Jam attribute and proceeding only if the player is able to be jammed). For example, the character object of the second player may indicate radar mode=Jammed. While in the jammed state, the second character's radar does not identify locations of other characters, and the second character may optionally be lit up and appear on all enemy radar, as described above. Video game 401 may jam the second player's radar based on how close the first player's shot was to the second player, or based on how far away the first player was from the second player when the first player shot at the second player. In step 1109 the video game determines whether the predetermined amount of time for the radar jamming has expired. If so, the radar of the second character is placed back in the Normal state in step 1101.

According to other variations, radar jamming might result by other than a character firing a weapon at another character. For example, a first character might plant a mine or device (e.g., an equipment object) that, when approached by a second character, jams the radar of the second character. That is, radar jamming may result from any predetermined action directed at a character within the simulated environment of the video game. Radar jamming for some period of time might also result from any weapon, bullet or projectile that hits a character, e.g., to simulate disorientation of that character as a result of being hit by a weapon Radar Mimic As described above, a radar object may display a blip corresponding to friendly characters (e.g., characters having a same value for a team attribute 523 as the character to whom the radar object corresponds) with a first visual appearance (e.g., colored green), and may display a blip corresponding to enemy players (e.g., characters having a different value for team attribute 523 as the character to whom the radar object corresponds) with a second visual appearance (e.g., colored red). According to various aspects, a weapon or other object in video game 401 may provide a method (e.g., a default action, secondary action, or tertiary action method) that makes a first player character using the device or weapon appear on a second character's radar as a friendly player to the second character, regardless of whether the first character and second character are friends or enemies. When the first character activates the device or fires the weapon in this 'radar mimic' mode, and the first character appears on an enemy character's radar, the first character appears as a friend to the enemy character, e.g., by being displayed with the first visual appearance (e.g., as a green blip) instead of with the second visual appearance (e.g., as a red blip).

Radar mimic as described above may be performed, e.g., by altering radar mode attribute 517 to a predetermined value, e.g., Mimic. A radar object corresponding to the character object 501 may then display that character on all enemy players' radar as friendly. Alternatively, radar mimic may result from temporarily altering team attribute 523 to be other than the character objects initial team value. This change in appearance may be accomplished in a variety of ways. For example, the radar object code may include a data structure identifying an appearance value for each character object (e.g., identifying the team to which each character belongs).

According to various aspects, the duration of the radar mimic effect may last for some predetermined amount of time, e.g., 5 seconds, 10 seconds, etc. In addition, a character might only be able to activate the radar mimic mode once per predetermined period of time, based on attributes and methods inhibiting radar mimic similar as described above with respect to radar jamming. Radar mimic may also be directed at a first enemy character, thereby making the enemy character appear as a foe of his or her own friends (i.e., other enemy characters). That is, the targeted player swaps teams on radar (e.g., by changing team attribute 523), and the first enemy character might appear as an enemy blip on the radar of his/her own teammates. In such a manner, the other enemy characters might shy away from the first enemy character during the video game for the duration of the radar mimic mode, or may accidentally shoot the first enemy character prior to visually confirming that the first enemy character is indeed a friend.

Figure 12:
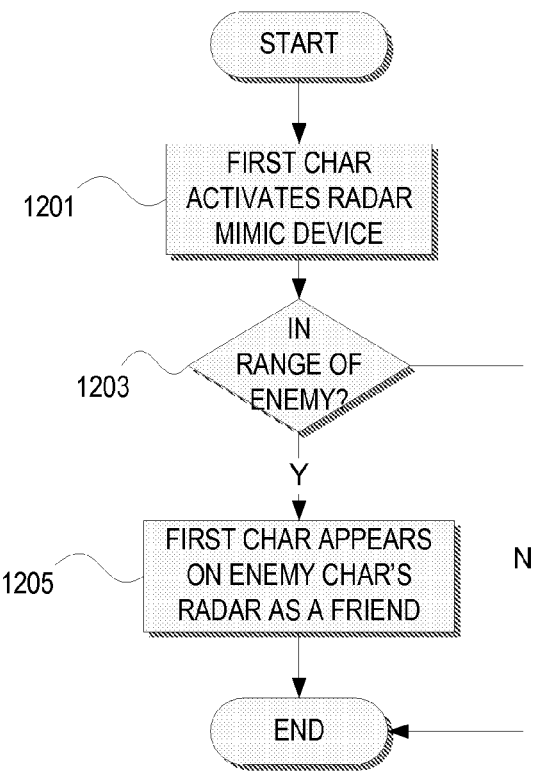
FIG. 12 illustrates a method for performing radar mimic in a video game according to one or more illustrative aspects described herein.

FIG. 12 illustrates a method for performing a radar mimic according to various aspects described herein. In the method illustrated in FIG. 12, a first player character and a second character are enemies in the video game, e.g., because they are on opposing teams in a multiplayer match. In step 1201 the first player activates a radar mimic device, e.g., by firing a designated weapon object using a primary action, secondary action, or tertiary action that causes radar mimic as described herein, or by performing a method on some other device or equipment object corresponding to or proximately located to the first player character in the simulated environment of the video game 401.

In step 1203, the video game 401 determines whether the first player is within the range of any other player's radar, such as an enemy character's radar. If so, in step 1205 the video game 401 displays a blip on the enemy second character's radar corresponding to the first player character, but displays the blip as if the first player character is a friend of the second character. This may result from altering a radar object state or changing a team attribute, as described above.

As indicated above, the first player character may falsely appear as a friend to the second character for some predetermined amount of time. If the video game is using an acoustic radar, and if the first player character performed some action or fired a weapon which causes the first player character to appear on the second character's radar for longer than the effect of the radar mimic device, the radar blip corresponding to the first player character on the second character's radar may alter appearance at the end of the predetermined amount of time. That is, when the radar mimic effect has expired, the video game may revert the radar blip corresponding to the first player character on the second character's radar to again appear as an enemy to the second character for the remainder of the time that the first player character is to appear on the second character's acoustic radar according to the heuristics described above.

According to another variation, a radar mimic method of an object might have an area of effect attribute, and any character within a radius defined by the area of effect from the object is affected by the radar mimic method. For example, a radar mimic method of an object might have an area of effect of ten feet in the simulated environment of the video game. If a first player character activates the relevant radar mimic device, and two teammates of the first player character are located within the area of effect (here, ten feet) of the first player character at the time of activation (or at any time while the radar mimic device is active), then not only does the first player character appear as a friend on the relevant radar of any enemy characters, but the two teammates appear as friends on the relevant radar of any enemy characters as well.

Friend/Foe Ambiguity

According to another aspect, a weapon may provide a method (e.g., resulting from a default action, secondary action, or tertiary action) that temporarily causes a character not to be able to distinguish visually between friends and foe. That is, friends and enemies appear similarly, or ambiguously. When a first player character aims and fires the weapon at a location within a predetermined distance from a second character in the simulated environment of the video game, the video game may cause the second character to enter a state (e.g., referred to as a psychosis state or psychosis effect) whereby the second character cannot distinguish friendly and enemy characters.

According to one aspect, a weapon object fired in a predetermined mode, e.g. a Pistol 5 object fired using a secondary trigger pull method, performs a Psychosis method that toggles a psychosis attribute 519 of a character object at which the weapon object is aimed. As a result of the weapon object hitting the character object, the psychosis attribute may temporarily be changed to YES or TRUE. UI module 409 and/or graphics module 411, when rendering other characters for display on a video output device, may determine an appearance of each character based in part on the value of the psychosis attribute 519. When the psychosis attribute is NO or FALSE, characters may be rendered as normal. When the psychosis attribute is YES or TRUE, characters may be rendered as described below. Other approaches may be used as well to implement such features.

For example, while in the psychosis state (e.g., psychosis attribute is YES or TRUE) the video game may cause all visible characters to appear as enemies of the second character, thereby causing a player controlling the second character to shoot at all visible characters. In such an example, the video game may render all visible characters as having colors, uniforms and/or some other visual appearance or cue (e.g., changing colors to an enemy colored uniform or appearance, scary features, etc.) which make them appear as enemies to the character under the psychosis effect. If the video game provides a radar that distinguishes friend from enemy, the video game may also cause any character within radar range to all appear as an enemy on the radar image. In such a scenario, the second character's team is put at a temporary disadvantage, because the second character may try to attack all visible characters, including his or her own teammates. That is, if the second character attacks another character, the second character may in fact be attacking one of her own teammates, but cannot tell the difference due to the psychosis effect. The appearance of a character may be defined in a character object data file, which may include predefined textures and visual characteristics for the character, and changing the visual appearance of a character in the psychosis state may involve causing a given character object to identify a different data file for its appearance.

As another example, the video game may cause all visible characters to appear as friends of the second character, thereby causing a player controlling the second character to stop firing altogether. In such an example, the video game may render all visible characters as having colors, uniforms and/or some other visual appearance or cue (e.g., changing colors to a friendly-colored colored uniform or appearance, appealing features, etc.) which make them appear as friends of the character under the psychosis effect. If the video game provides a radar that distinguishes friend from enemy, the video game may also cause the characters within radar range to all appear as friends on the radar image. In such a scenario, the second character's team is put at a temporary disadvantage, because the second character does not know who to attack. If the second character attacks another character, the second character may in fact attack one of her own teammates.

As another example, the video game may cause all visible characters to appear as neutral characters, thereby causing a player controlling the second character to be unsure whether to shoot visible characters or not. In such an example, the video game may render all visible characters as having colors, uniforms and/or some other visual appearance or cue which make them appear neutral to the character under the psychosis effect. If the video game provides a radar that distinguishes friend from enemy, the video game may also cause the characters within radar range to all appear as neutral characters on the radar image.

The duration of the psychosis effect may be any predetermined amount of time (e.g., 5 seconds, 10 seconds, etc.), and the amount of time may depend on how close the weapon was aimed to the second player (e.g., a direct hit, graze, etc.), may depend on the distance of the first character to the second character when the first character fired the weapon, or may depend on other factors. According to an illustrative aspect, if the second character under the psychosis effect kills a member of his or her own team while under the psychosis effect, the kill might be attributed to the first player character that shot or otherwise caused the second character to be under the psychosis effect. A character may or may not be immune from the psychosis effect for some predetermined period of time after the psychosis effect has ended, e.g., by inhibiting toggling of the psychosis attribute 519.

Figure 13:
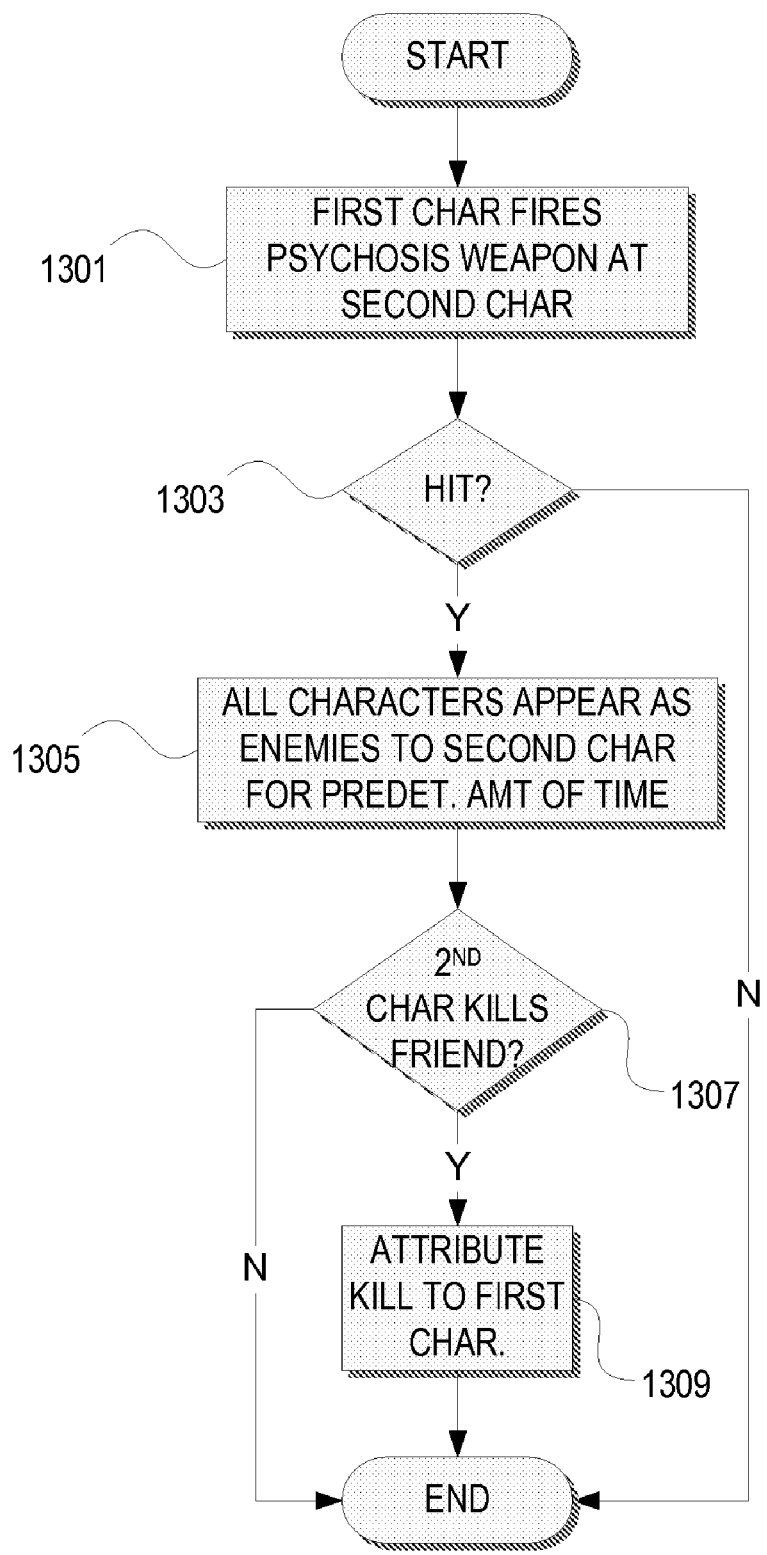
FIG. 13 illustrates a method for performing ambiguous display of friends and enemies in a video game according to one or more illustrative aspects described herein.

FIG. 13 illustrates a method for performing a psychosis effect according to one or more illustrative aspects. In step 1301 a first player character aims and fires a weapon in a primary, secondary, or tertiary mode that provides a psychosis effect upon hitting another character. In step 1303, video game 401 determines whether the first player character hit the second character. If so, in step 1305 the video game causes the second character to perceive all visible characters as enemies to the second character, e.g., by rendering all visible characters in uniforms or otherwise altering a visual appearance of friendly characters to make them appear as enemies to the second player character. Video game 401 may also cause the second character's radar to display his/her own teammates as enemies.

In step 1307, video game 401 determines whether the second character killed any of his or her own teammates or friends while under the psychosis effect. If so, the video game may attribute such kills to the first player character who shot the second character or otherwise caused the second character to be under the psychosis effect. For example, if a first character object performs a method that fires a weapon object at a second character object, resulting in the death of the second character object, and both the first and second character objects have the same value for their respective team attribute 523, and the psychosis attribute 519 of the first character object is YES or TRUE, the video game 401 attributes the kill to a third character object that caused the psychosis attribute 519 of the first character object to be true.

The change in visual appearance may be graphically depicted on an output device (e.g., display device 591) corresponding to the player whose character is under the psychosis effect. The visual appearance may also to visually depict friends as enemies, e.g., by depicting friends as wearing enemy uniforms, taking on the physical appearance of an enemy, or any other visual appearance or cue.

Duplicate Character Image

According to another illustrative aspect, a weapon or device may provide a method (e.g., a primary action, secondary action, or tertiary action) which, when activated, initiates a duplicate image mode that causes a hologram to appear that duplicates the appearance and/or actions of a first player character to other characters in the video game. The hologram of the first player character may appear at a constant offset from the actual first player character, and may maintain a same orientation as the actual image of the first player character (e.g., if the actual player character rotates 90 degrees to the right, the hologram image also rotates 90 degrees to the right; if the actual player moves two steps forward, the hologram image also moves two steps forward). The hologram first player character thereby duplicates the appearance and actions of the actual first player character. Those characters and player characters that view the original and hologram of the first player character will have difficulty visually telling the difference between the two, and thereby do not know which one to shoot. If characters shoot the hologram, the player character might take no damage, thereby providing the first player character a strategic advantage in the video game. However, shooting the hologram of the first player may temporarily disrupt the hologram, e.g., by displaying static in the hologram, or by the hologram image shuddering briefly, thereby indicating to the shooter which image is real and which image is the hologram. In addition, a character might run slower (e.g., a speed attribute of a character object might be reduced) when a hologram is active, thereby balancing any advantage the player might gain by using a holographic duplicate image. According to an alternative aspect, the hologram may move independently of the actual image. That is, the player may provide first predetermined input via controller 104 to enter a first mode to control the actual player character, and second predetermined input to enter a second mode to control the hologram image of the player character.

Figure 14:
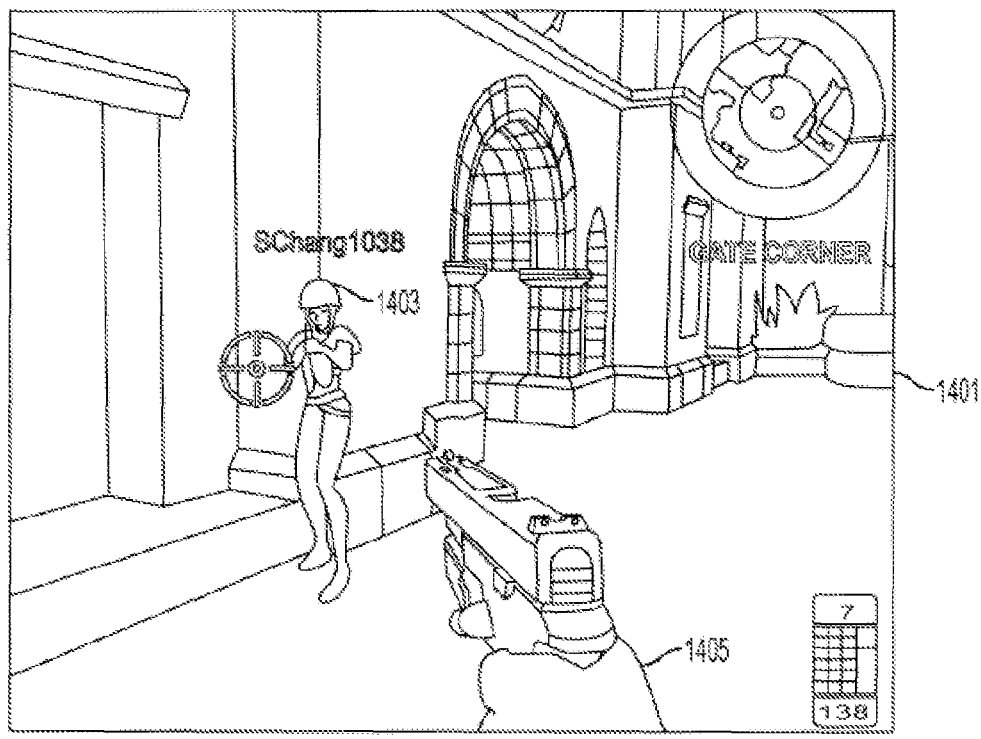
FIG. 14 illustrates a screenshot of a video game prior to a hologram image being created according to one or more illustrative aspects described herein.
Figure 15:
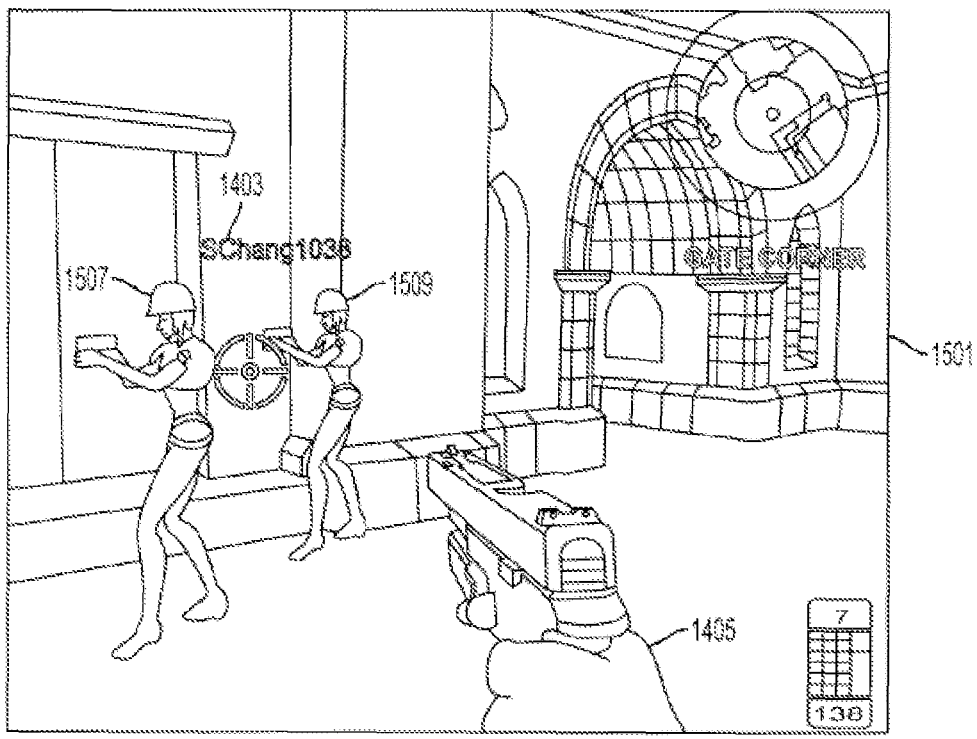
FIG. 15 illustrates a screenshot of a video game subsequent to creation of a hologram image according to one or more illustrative aspects described herein.

FIG. 14 illustrates a screenshot 1401 of video game 401 from a first person perspective of a second player character 1405 prior to a first player character 1403, identified as SChang1O38, activating a hologram mode. FIG. 15 illustrates a screenshot 1501 of video game 401 from the first person perspective of the second player 1405 subsequent to the first player character 1403 activating the hologram mode. In FIG. 15, character image 1507 and 1509 represent the actual player character and hologram player character, although second player character 1405 cannot distinguish between the two unless the second player character watched as the hologram appeared. The identification of player 1403, SChang1O38, is rendered between the two images 1507, 1509 so as not to inadvertently identify the actual image and the hologram image.

Figure 16:
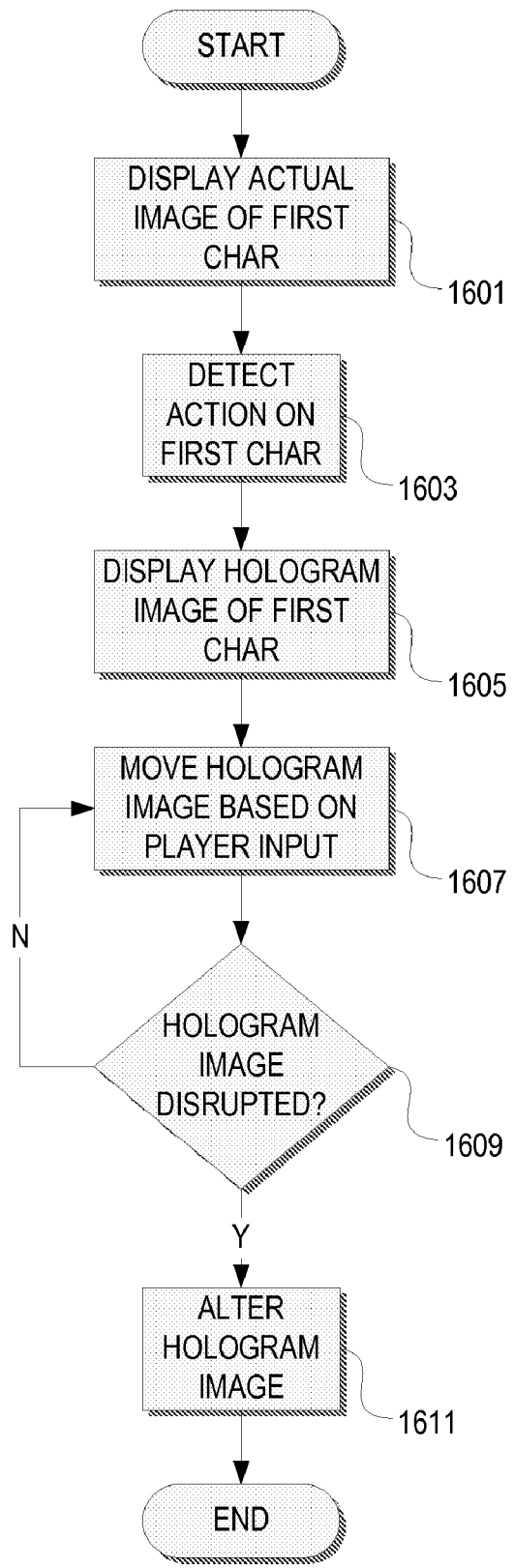
FIG. 16 illustrates a method for performing duplicate image effect in a video game according to one or more illustrative aspects described herein.

FIG. 16 illustrates a method for creating and controlling a hologram according to one or more illustrative aspects. In step 1601, the video game 401 displays only the actual image of the first player character, e.g., prior to the first player character initiating a hologram or duplicate image mode. The first player character may appear to other characters, e.g., as illustrated in FIG. 14. In step 1603, the video game receives input indicating that a predetermined action associated with creating a hologram image of the first player character has been performed. The predetermined action may include, e.g., the first player character activating a weapon or device that causes a hologram image to appear, or activating an alternate mode of a weapon or device that causes a hologram image to appear.

In one illustrative embodiment, the character object of the first player character may perform a secondary action while Possessing a Machine Gun 3 object. The Machine Gun 3 object performs a secondary trigger pull method, which causes the Machine Gun 3 method to perform the Toggle_Hologram method. The Toggle Hologram method may check the status of secondary ammo attribute 563 to determine whether any ammunition remains. Here, because the hologram is not a weapon, the secondary ammo may instead refer to an amount of time accumulated or available for use in producing the hologram image. If the secondary ammo attribute 563 indicates that there is hologram time remaining, then the Toggle_Hologram method changes the hologram attribute 564 to ON. Toggle_Hologram method 573 may continue to execute, e.g., running a timer to decrement the secondary ammo attribute 563, based on the length time the hologram attribute 564 is ON.

In step 1605, based on the predetermined action, video game 401 displays a hologram image of the first player character as well as the actual image of the first player character, for example, as illustrated in FIG. 15. In step 1607, as video game 401 receives input from the player controlling the first player character, video game 401 moves the hologram image based on the received input. As indicated above, the movement may be identical to or separate from movement of the actual image of the first player character.

In step 1609, video game 401 determines whether the hologram is disrupted, e.g., due to enemy weapon fire, depletion of energy sustaining the hologram, depletion of secondary ammo attribute 563, etc. If the hologram is disrupted, then in step 1611 video game 401 alters the displayed hologram image within the simulated environment of the video game, e.g., by displaying static in the hologram, a brief shudder of the hologram, removing the hologram altogether, etc. There are a number of ways this change in appearance can be implemented. For example, a hologram object routine may access the same visual appearance data for the duplicated character, but may alter color values prior to display to generate the different appearance, the shudder, static, etc.

According to various illustrative aspects, the player character might not be able to inflict damage using the hologram image, but can use the hologram image to safely scout enemy territory without taking damage. That is, UI module 409 and/or graphics module 411 may render the video display to depict a view of the simulated environment as if viewed from the hologram's location and direction of view. However, while controlling the hologram image, the player may leave the actual character vulnerable to attack from others. In yet another alternative, once the hologram mode is activated, the player can only control the hologram image, and the actual player character remains stationary.

According to another aspect, while the player character cannot take damage as a result of the hologram being hit by enemy fire, the hologram may be destroyed, e.g., because it gets disrupted or destroyed by enemy attack. If the hologram is hit, the player character may take no damage, but the hologram may be destroyed and the player character might be required to wait a predetermined amount of time before initiating or creating another hologram. Or if the hologram had traveled far, the player character might be required to create a new hologram at his or her present location, thereby requiring the new hologram to also travel the same distance to reach the location where the previous hologram was destroyed. The various behavior characteristics of the hologram may be implemented as a separate hologram routine instantiated when the hologram function is activated.

The features described above are preferably encoded in computer software as executable instructions that can be executed on a computing device, such as a personal computer or video game console, to result in the display of the screens shown in the figures. The executable instructions may be stored on a computer-readable medium, such as one or more computer disks, RAMs, CD-ROMs, DVDs, game cartridges, etc. Also, although various features are described above, it is not necessary to practice them all in the same embodiment. Instead, various combinations and subcombinations may be implemented as desired, and the scope of the present invention should only be limited by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim the following:

1. One or more computer readable storage device storing executable instructions for performing a video game method of representing characters on a radar image displayed on a video output device, said method comprising steps of:
   determining a first simulated noise level associated with a first object in a simulated environment operating under control of the video game; and
   displaying on the radar image, said radar image corresponding to a first character, a first radar blip corresponding to the first object, said first radar blip having a first characteristic based on the first simulated noise level associated with the first object
   determining a second simulated noise level associated with the first object in the simulated environment operating under control of the video game, wherein said second simulated noise level is determined to be louder than said first simulated noise level; and
   displaying on the radar image corresponding to the first character, a second radar blip corresponding to the first object, said second radar blip having a first characteristic based on the second simulated noise level associated with the first object,
   wherein the first characteristic of the first radar blip comprises a first amount of time based on the first simulated noise level,
   wherein the first characteristic of the second radar blip comprises a second amount of time based on the second simulated noise level, said second amount of time being longer than said first amount of time,
   wherein displaying the first radar blip comprises displaying the first radar blip for the first amount of time, and
   wherein displaying the second radar blip comprises displaying the second radar blip for the second amount of time.

2. The computer readable storage media of claim 1, wherein the first simulated noise level corresponds to a first weapon being used by a second character in the simulated environment, and wherein the second simulated noise level corresponds to a second weapon being used by the second character in the simulated environment.

3. The computer readable storage media of claim 1, wherein the first simulated noise level corresponds to a first mode of a first weapon being used by a second character in the simulated environment, and wherein the second simulated noise level corresponds to a second mode of the first weapon being used by the second character in the simulated environment.

4. The computer readable storage media of claim 1, wherein the first simulated noise level corresponds to a weapon in use by a second character in the simulated environment of the video game, and wherein the first radar blip corresponding to the first object corresponds to an approximate current location of the second character.

5. The computer readable storage media of claim 4, further comprising the step of, while the first radar blip is displayed on the radar image, maintaining the first radar blip to correspond to the approximate current location of the second character as the second character moves in the simulated environment.

6. The computer readable storage media of claim 1, wherein the first simulated noise level corresponds to a weapon in use by a second character in the simulated environment of the video game, and wherein the first radar blip corresponding to the first object corresponds to a point of impact of a projectile fired from the first weapon.

7. One or more computer readable storage device storing executable instructions for performing a video game method of representing characters on a radar image displayed on a video output device, said method comprising steps of:
    providing an acoustic radar system to a first character in a simulated environment of the video game, said acoustic radar system identifying a location of a second character in the simulated environment based on a noise level associated with the second character;
    receiving first input indicating said second character has fired a first type of projectile in the simulated environment;
    displaying, on the acoustic radar system of the first character, a first radar blip corresponding to a location of impact of the first type of projectile;
    receiving second input indicating said second character has fired a second type of projectile in the simulated environment; and
    displaying, on the acoustic radar system of the first character, a second radar blip corresponding to a location from which the second character fired the second type of projectile,
    wherein said first type of projectile comprises a decoy bullet, and wherein said second type of projectile comprises a non-decoy bullet, and
    wherein said decoy bullet is fired by a first operational state of a first weapon and said non-decoy bullet is fired by a second operational state of the first weapon.

8. The computer readable storage media of claim 7, the method further comprising the step of providing an audible report at the location of impact within the simulated environment of the video game.

9. The computer readable storage media of claim 7, wherein the receiving and displaying steps occur in time proximity such that a player of the video game perceives the receiving and displaying steps to occur simultaneously.

10. The computer readable storage media of claim 7, the method further comprising causing a time delay between the receiving and displaying steps.

11. The computer readable storage media of claim 7, further comprising steps of:
    attributing a first damage amount based on the first type of projectile; and
    attributing a second damage amount, higher than said first damage amount, based on the second type of projectile.

12. One or more computer readable storage device storing executable instructions for performing a video game method of representing characters on a radar image displayed on a video output device, said method comprising steps of:
    providing a radar system to a first character in a simulated environment of the video game, wherein said first character's radar system, when in a normal operation state, identifies on the radar image a location of a second character in the simulated environment relative to a location of the first character in the simulated environment;
    receiving first input indicating said second character has performed a predetermined action directed at the first character in the simulated environment;
    placing the first character's radar system in a jammed state for a predetermined amount of time, wherein when in said jammed state, said radar system does not identify the location of the second character; and
    while the first character's radar system is in the jammed state, displaying an indication on a non-jammed radar system of another character that the first character's radar system is in the jammed state.

13. The computer readable storage media of claim 12, wherein said predetermined action comprises the second character firing a predetermined weapon at the first character in the simulated environment of the video game.

14. The computer readable storage media of claim 13, wherein the predetermined weapon comprises a secondary mode of a rifle, said rifle having a primary mode providing a long-range sniper capability.

15. The computer readable storage media of claim 12, wherein said predetermined amount of time is approximately 10 seconds.

16. The computer readable storage media of claim 12, the method further comprising the step of requiring the first character's radar system to be in the normal operation state for a predetermined amount of time prior to entering the jammed state a second time.

* * * * *